US012576345B2

(12) United States Patent
Ward et al.

(10) Patent No.: US 12,576,345 B2
(45) Date of Patent: Mar. 17, 2026

(54) CHROMATOGRAPHY COLUMN PACKING MEDIUM RECOVERY

(71) Applicant: Repligen Corporation, Waltham, MA (US)

(72) Inventors: Travis R. Ward, Medford, MA (US); James Ronald Peyser, Billerica, MA (US); Dana Pentia, Arlington, MA (US); Evan Frankel, Hyde Park, MA (US)

(73) Assignee: Repligen Corporation, Waltham, MA (US)

( * ) Notice: Subject to any disclaimer, the term of this patent is extended or adjusted under 35 U.S.C. 154(b) by 1132 days.

(21) Appl. No.: 16/308,629

(22) PCT Filed: Jun. 12, 2017

(86) PCT No.: PCT/US2017/037030
§ 371 (c)(1),
(2) Date: Jul. 15, 2019

(87) PCT Pub. No.: WO2017/214623
PCT Pub. Date: Dec. 14, 2017

(65) Prior Publication Data
US 2019/0270034 A1     Sep. 5, 2019

Related U.S. Application Data

(60) Provisional application No. 62/348,760, filed on Jun. 10, 2016.

(51) Int. Cl.
*B01D 15/22*     (2006.01)
*B01D 15/20*     (2006.01)
*G01N 30/56*     (2006.01)

(52) U.S. Cl.
CPC ............. *B01D 15/22* (2013.01); *B01D 15/20* (2013.01); *B01D 15/206* (2013.01); *G01N 30/56* (2013.01); *G01N 2030/565* (2013.01)

(58) Field of Classification Search
None
See application file for complete search history.

(56) References Cited

U.S. PATENT DOCUMENTS 5,462,659 A     10/1995   Saxena
5,667,676 A      9/1997   Alaska
(Continued)

FOREIGN PATENT DOCUMENTS

CN     101972558 A     2/2011
CN     102947696 A     2/2013
(Continued)

OTHER PUBLICATIONS

International Search Report and Written Opinion Mailed Oct. 12, 2017 for PCT/US/037030 filed Jun. 12, 2017.
(Continued)

*Primary Examiner* — Kara M Peo
(74) *Attorney, Agent, or Firm* — KDW Firm PLLC

(57) ABSTRACT

Systems include a chromatography column tube having an inlet and outlet and port assembly arranged in a wall of the column tube between flow distributors that together form a chamber within the tube that is filled with packing medium are described. The port assembly facilitates the removal of resin from the pre-packed column and the port assembly does not affect fluid flow in the normal use of the column for chromatographic separation or ability to maintain sanitary conditions within the column. Also described are methods that include attaching tubing to a pump and to a column inlet and a column outlet, opening the port assembly, attaching tubing to the port assembly and to a second reservoir, and
(Continued)

pumping aqueous solution from a reservoir into the chamber and out through the port assembly into the second reservoir, thereby removing packing medium from the column along with the flowing aqueous solution.

7 Claims, 19 Drawing Sheets

(56) References Cited

U.S. PATENT DOCUMENTS

| | | | |
|---|---|---|---|
| 6,740,241 | B1 | 5/2004 | Dickson |
| 8,685,241 | B1 | 4/2014 | Saxena et al. |
| 2007/0138076 | A1 | 6/2007 | Daridon et al. |
| 2012/0145619 | A1 | 6/2012 | Urdahl et al. |
| 2015/0174514 | A1* | 6/2015 | Lin ...................... B01D 46/543 |
| | | | 210/450 |

FOREIGN PATENT DOCUMENTS

| | | | |
|---|---|---|---|
| CN | 104245077 | A | 12/2014 |
| EP | 0105583 | A1 | 4/1984 |
| EP | 1396721 | A1 | 3/2004 |
| EP | 1566631 | A1 | 8/2005 |
| JP | 2004-233335 | A | 8/2004 |
| JP | 2011-525987 | A | 9/2011 |
| JP | 2013015492 | A | 1/2013 |
| WO | 2008134413 | A1 | 11/2008 |
| WO | 2009094203 | A2 | 7/2009 |
| WO | 2011076386 | A1 | 6/2011 |

OTHER PUBLICATIONS

Supplementary European Search Report mailed Jan. 10, 2020 for European Patent Application No. 17811158.9.

* cited by examiner

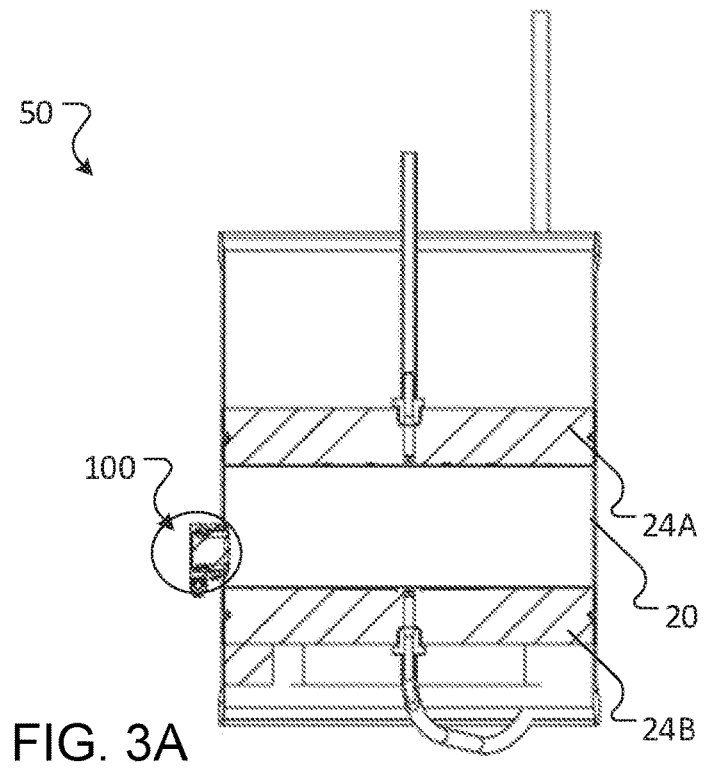
FIG. 3A
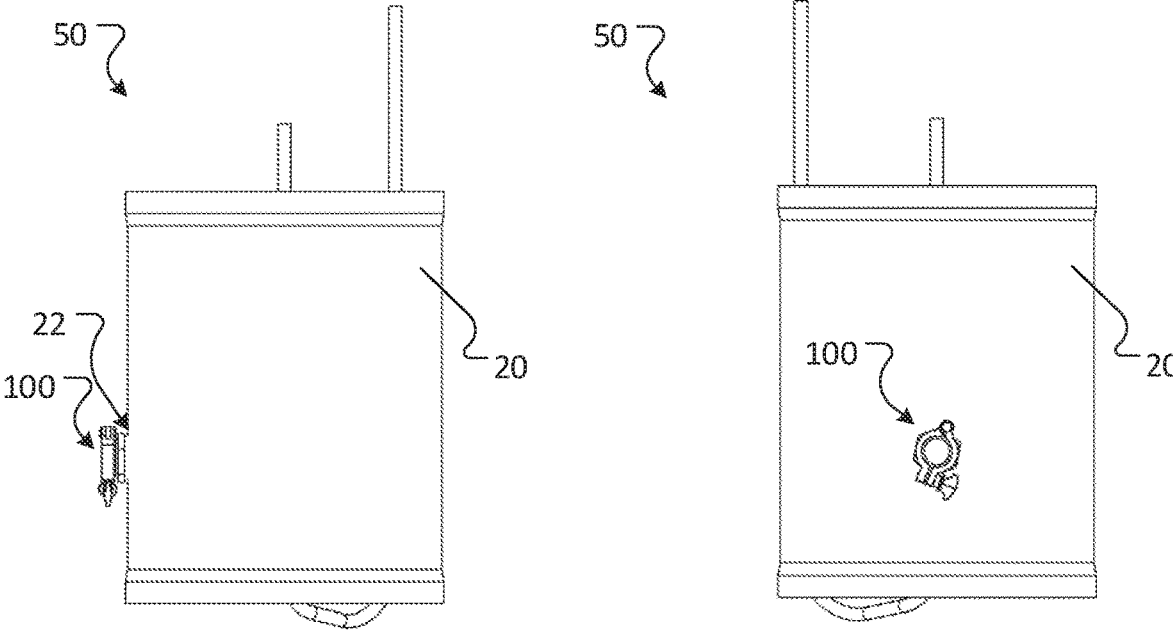
FIG. 3B
FIG. 3C

OUTSIDE COLUMN WALL

INSIDE COLUMN WALL

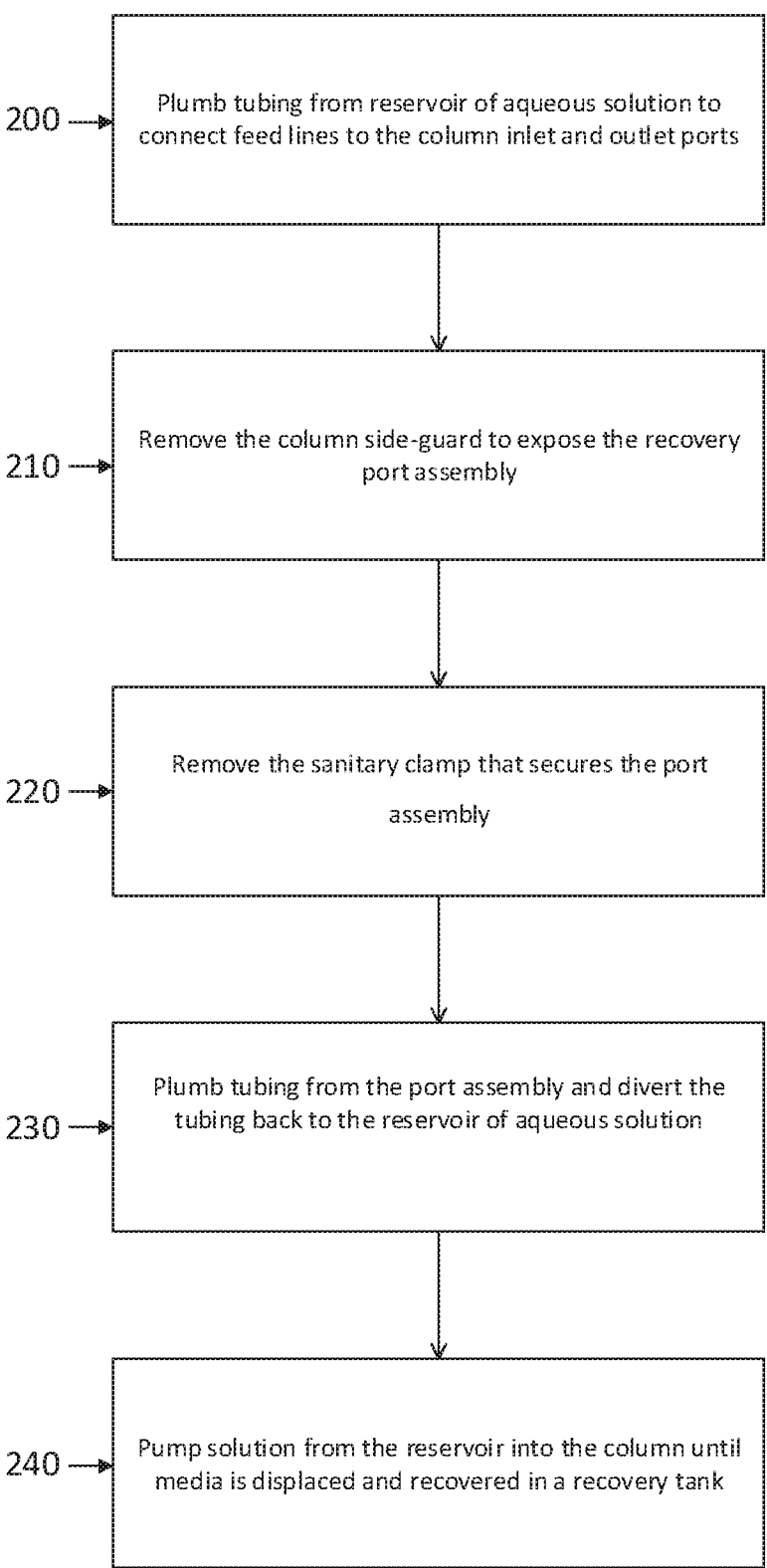

200 — Plumb tubing from reservoir of aqueous solution to connect feed lines to the column inlet and outlet ports 210 — Remove the column side-guard to expose the recovery port assembly 220 — Remove the sanitary clamp that secures the port assembly 230 — Plumb tubing from the port assembly and divert the tubing back to the reservoir of aqueous solution 240 — Pump solution from the reservoir into the column until media is displaced and recovered in a recovery tank

FIG. 8

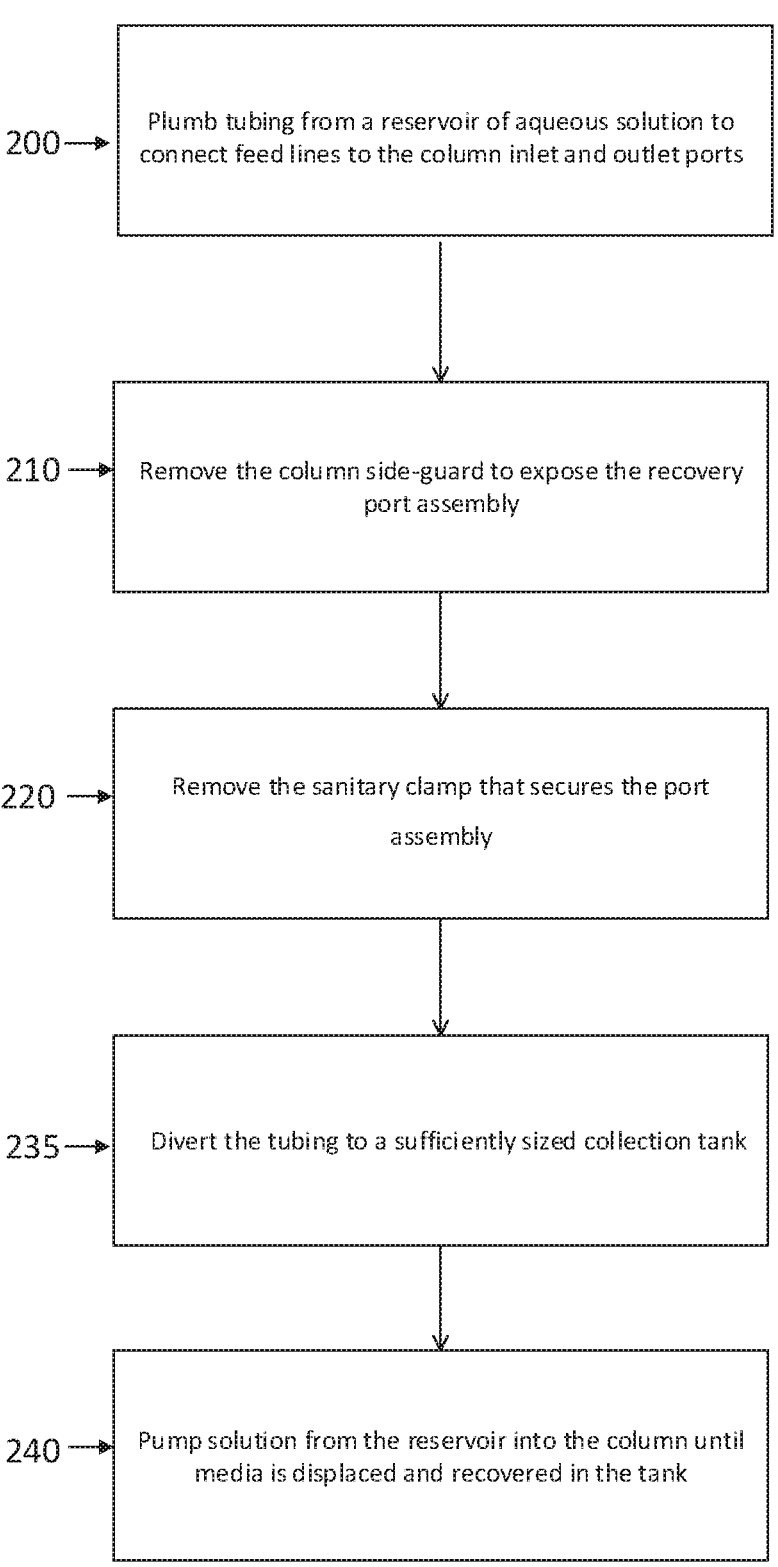

200 → Plumb tubing from a reservoir of aqueous solution to connect feed lines to the column inlet and outlet ports 210 → Remove the column side-guard to expose the recovery port assembly 220 → Remove the sanitary clamp that secures the port assembly 235 → Divert the tubing to a sufficiently sized collection tank 240 → Pump solution from the reservoir into the column until media is displaced and recovered in the tank

FIG. 10

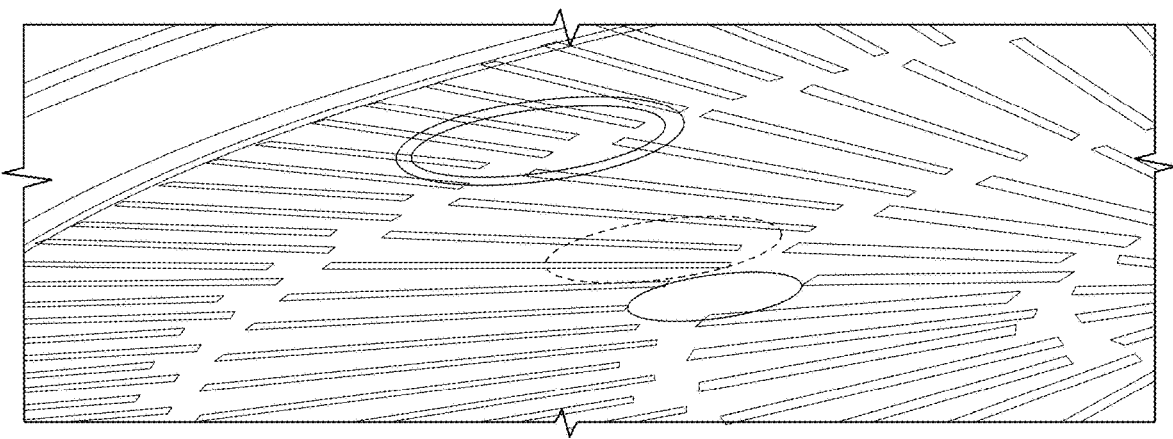
FIG. 13D
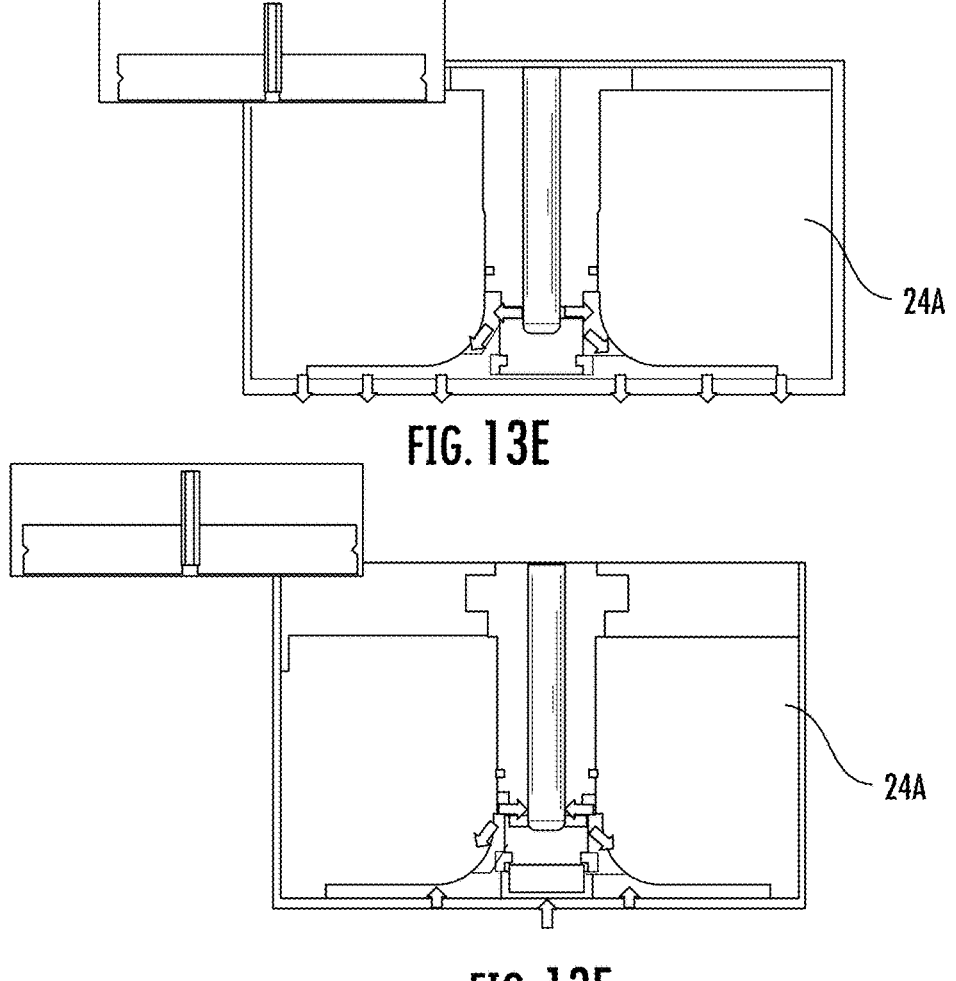
FIG. 13E
FIG. 13F

Superficial Velocity in Media (cm/h)

Superficial Velocity in Media (cm/h)

CHROMATOGRAPHY COLUMN PACKING MEDIUM RECOVERY

CROSS-REFERENCE TO RELATED APPLICATION

This application is a national stage filing under 35 U.S. § 371 of Intl. Appln. No. PCT/US2017/037030, filed Jun. 12, 2017, which claims benefit under 35 U.S.C. § 119 (e) to provisional U.S. Patent Appln. No. 62/348,760, filed Jun. 10, 2016, the entire contents of which are hereby incorporated by reference.

TECHNICAL FIELD

This invention relates to methods and system for removing and recovering column packing medium from chromatograph columns.

BACKGROUND

Column chromatography is a separation and/or purification technique in which a stationary "bed" of a packing medium is contained within a rigid tube. The packing medium can be in the form of particles of a solid ("stationary phase") or a solid support material coated with a liquid stationary phase. Either way, the packing medium typically fills the inside volume of the column tube.

In separation chromatography, as a liquid sample ("mobile phase") passes through the column, different compounds in the sample can associate differentially with the stationary phase (e.g., packing medium) such that they are slowed relative to the mobile phase and move through the column at different speeds. Thus, those compounds that associate more with the stationary phase move more slowly through the column than those that associate less, and this speed differential results in the compounds being separated from one another as they pass through and exit the column. Features of the stationary phase that promote differential association can be, e.g., ionic charge (ion exchange chromatography), hydrophobicity (hydrophobic interaction chromatography), and porosity (size exclusion chromatography).

In yet another type of column chromatography, affinity chromatography, the packing medium includes binding agents, such as antigens, antibodies, or ligands, that specifically bind to one or more desired compounds or molecules in the liquid sample. Thus, as the liquid sample flows through the packing medium only the desired compounds or molecules remain in the column. A subsequent flow through the packing medium of an eluting liquid separates the desired compounds or molecules from the binding agents attached to the packing medium, or separates the binding agents from the packing medium. Either way, the desired compounds or molecules are rinsed out of the column and collected in the eluting fluid. Affinity chromatography can be used in a number of applications, including nucleic acid purification, protein purification from cell free extracts, and purification from blood.

The main components of a chromatography column are the column or tube, which is often made of a metal, glass, or highly rigid plastic material, and a pair of flow distributors, which are typically inserted into the two ends of the tube to form a space or chamber in the tube between the flow distributors into which the packing medium is loaded.

Chromatography columns packed with separation media on site usually have an adjustable top distributor that allows for adjusting the top flow adaptor position or removal of the adaptor to recover the separation media for regeneration or reprocessing in the event that the column has lost performance. Performance can be lost due to process deviations such as inadvertently pumping the solution-filled separation media dry or through repeated process cycles and slow deterioration of performance due to feed stream fouling of the separation media.

Chromatography columns can be pre-packed and used upon demand for development and commercial bioprocess manufacturing. These columns are produced and fixed in bed height such that flow distributors are irreversibly aligned within the chromatography tube. While pre-packed columns have the advantage over conventional on site packed columns of ease of use and overall economic advantage, the inability to recover and reprocess the separation media is a disadvantage.

SUMMARY

The invention is based, at least in part, on the discovery that if you provide a packing medium recovery port on a chromatography column arranged between the two flow distributors, you can then simply and quickly remove the packing medium in the chromatography column. In addition, by using a specific design of the packing medium-recovery port, you can avoid disruption of the chromatography flow path and the formation of dead zones within the column.

The present discovery includes the recognition that recovering media from a pre-packed column that has lost performance must be done in a way that does not damage or contaminate the separation media. Any port included in a pre-packed column must not interfere with the chromatographic separation properties or the ability to maintain a sanitary condition of the column when used repeatedly. The present systems and methods provide pre-packed chromatography columns that allow recovery of the separation media in an intact and unadulterated form and that do not impair the separation performance of the column or increase the risk of increasing an unwanted bioburden during normal use of the column.

Accordingly, the present disclosure describes a series of chromatography columns, e.g., pre-packed disposable chromatography columns, which enable the simple removal of the packing medium. In a first aspect, the disclosure provides pre-packed chromatography columns, e.g., that can be shipped for use in biomanufacturing, that contains structural components that enable resin to be recovered in a manner that preserves the suitability of that resin for subsequent use in biomanufacturing processes.

The new designs include a column tube; a specifically designed packing medium recovery port; and two flow distributors, e.g., made of a metal, ceramic, or a plastic such as polypropylene, each with a mesh, e.g., made of a metal or plastic, such as polypropylene, secured, e.g., by welding, e.g., ultrasonic welding, to one surface of the flow distributors. The flow distributors can be press-fit or otherwise secured into the column tube, e.g., a polypropylene/composite tube. The flow distributors are secured sufficiently to maintain a liquid tight seal and to help keep the flow distributor fixed after being positioned in the tube. The press-fit configuration allows for multiple bed heights to be achieved with a standard tube length.

In another general aspect, the disclosure provides methods of recovering packing medium from a pre-packed chromatography column as disclosed herein. The methods include attaching tubing from a first reservoir of aqueous solution to a pump and to the column inlet and the column outlet; opening the recovery port assembly; attaching tubing to the port assembly and to a second reservoir; and pumping the aqueous solution from the first reservoir into the column inlet and column outlet into the chamber and out through the port assembly into the second reservoir, thereby removing packing medium from the column along with the flowing aqueous solution.

In some embodiments the first and second reservoirs are the same reservoir, while in other embodiments the second reservoir is different from the first reservoir.

The methods can further include filtering and retaining the packing medium through a mesh in the second reservoir creating a system that recycles the unpacking solution to reduce the required total volume and therefor dilution of the resin slurry. The method can further include pumping and/or directing air into the chromatography column via the outlet in an amount, at a volume, and in a manner sufficient to stir the packing medium in the column. In some implementations, the packing medium in the column is removed in less than 20, 10, 5, 3, 2, or 1 minutes, e.g., 2 minutes, using less than 5 CV of aqueous solution, e.g., less than 4, 3, 2, or 1 CV of aqueous solution. In some embodiments, the packing medium includes a slurry of stationary phase particles comprising any one or more of agarose, silica, ceramic, or a polymer of acrylate or cellulose based material.

The methods can further include pumping gas from a gas source into the chamber and out through the port assembly into the second reservoir, thereby removing packing medium from the column along with the flowing aqueous solution. In some implementations the method comprises pumping the aqueous solution from the first reservoir to refill the chamber and suspend any remaining resin particles. In some implementations the method includes repeating the steps of pumping gas from a gas a source and pumping solution to refill the chamber until a desired amount of resin is pumped into the second reservoir.

In another general aspect, the disclosure provides chromatography columns that include: a column tube comprising a cylindrical wall having a first end and a second end; a first flow distributor arranged within a first end of the column tube and a second flow distributor arranged within a second end of the column tube; an opening in the wall of the column tube between locations where the first flow distributor and the second flow distributor are secured in use; and a port assembly secured within the opening, wherein the port assembly is configured to permit removal of a fluid from within the column tube in a chamber formed between the first and second flow distributors.

In various embodiments, the port assembly includes a removable sanitary clamp on the outside of the column tube. Alternatively or in addition, the port assembly includes a port configured to be secured within the opening in the wall of the column. In some implementations, the port can include a flange arranged at an inner end of the port that is arranged within the chamber and wherein the flange has a beveled edge. For example, the flange of the port can project less than 4-6 mm, e.g., less than 3 or 2 mm, past an inside surface of the wall of the column. In general, the flange of the port is designed to have a minimal effect on flow properties of a fluid inside the column and is configured to avoid dead zones in a fluid inside the column.

As used herein, the terms "sealed," and the like refer to the fact that the juncture or junction of two chambers or other system components does not permit fluid to leak through the juncture or junction at pressures up to about 90 psi.

The terms "recovery" or "recover" and the like refer to the fact that the resin can be removed from the chromatography column in a way so as not to damage the resin. The design of the port used to recover the resin does not alter the performance of the column both in fluid dynamics and sterility/cleanability.

The terms "resin," "separation media," "chromatography media," and "medium" all refer to the particles suspended in a liquid that are used to fill the chromatography column. Examples of these resins include materials made of glass, plastic, cellulose, agarose, and other substances. The resins can be rough particles or beads. The beads can be monodisperse or have a population of sizes and can vary from 15 μm to 300 μm in size. The resins can be modified to contain various substituents that affect binding to the particles to achieve separation of proteins and other substances in a feed stream. The substituents can be positively or negatively charged, and/or hydrophobic, and/or can include a specific affinity moiety (such as protein A), or a combination of any one or more of these properties.

The new systems include a port that allows efficient and rapid removal of the resin without damage to the resin. A significant feature of the port is that when it is sealed it will maintain a closed chamber in the column that can remain sealed under high pressure up to about 90 psi. In addition, the port is designed to not extend into the column chamber and risk disrupting the chromatographic flow of materials during the operation of the column.

The disclosure also provides methods for removing the resin from the column chamber in a process compatible with standard biologic manufacturing processes.

The port design described herein is easy to use, does not impact column performance, and can be sealed in a way that can be easily cleaned and sanitized using standard methods during column operation. The small area in the inner wall of the column tube that the port occupies and the minimal projection of the port into the column tube ensures that column performance is not affected, and the flange and gasket inside of the column tube are designed to allow good flow properties around the port to avoid the formation of dead zones within the column tube. In addition, an O-ring on the port plug is positioned and designed to prevent the formation of a dead zone within the port where microbes and contaminants could accumulate during use. A gasket on the plug's fitting, e.g., a sanitary fitting such as a Tri-clamp fitting, allows the flow path for resin recovery to remain sanitary and acts as a secondary seal should the plug O-ring fail.

The new port design enables the removal and recovery of many different types of packing media, which accommodates the many different types of packing media, such as resins used by various users. The column contains structural components that allow resin to be recovered in a manner that preserves the suitability of that resin for subsequent use in biomanufacturing processes.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIG. 3A is a schematic diagram of a cross section of a chromatography column having a packing medium recovery port assembly.

FIGS. 3B-C are schematic diagrams of exterior views of a 45 cm chromatography column having a packing medium recovery port assembly of FIG. 3A.

FIG. 8 is a flow chart for one embodiment of steps used to recover packing medium from a chromatography column system as shown in FIG. 7.

FIG. 10 is a flow chart for another embodiment of steps used to recover packing medium from a chromatography column system, e.g., as shown in FIG. 9.

FIGS. 13A-F are part drawings for other embodiments of a packing medium recovery port assemblies.

Like reference symbols in the various drawings indicate like elements. In addition, any dimensions shown in the figures or described herein are not intended to be limiting and are included by way of example only.

DETAILED DESCRIPTION

Figure 1:
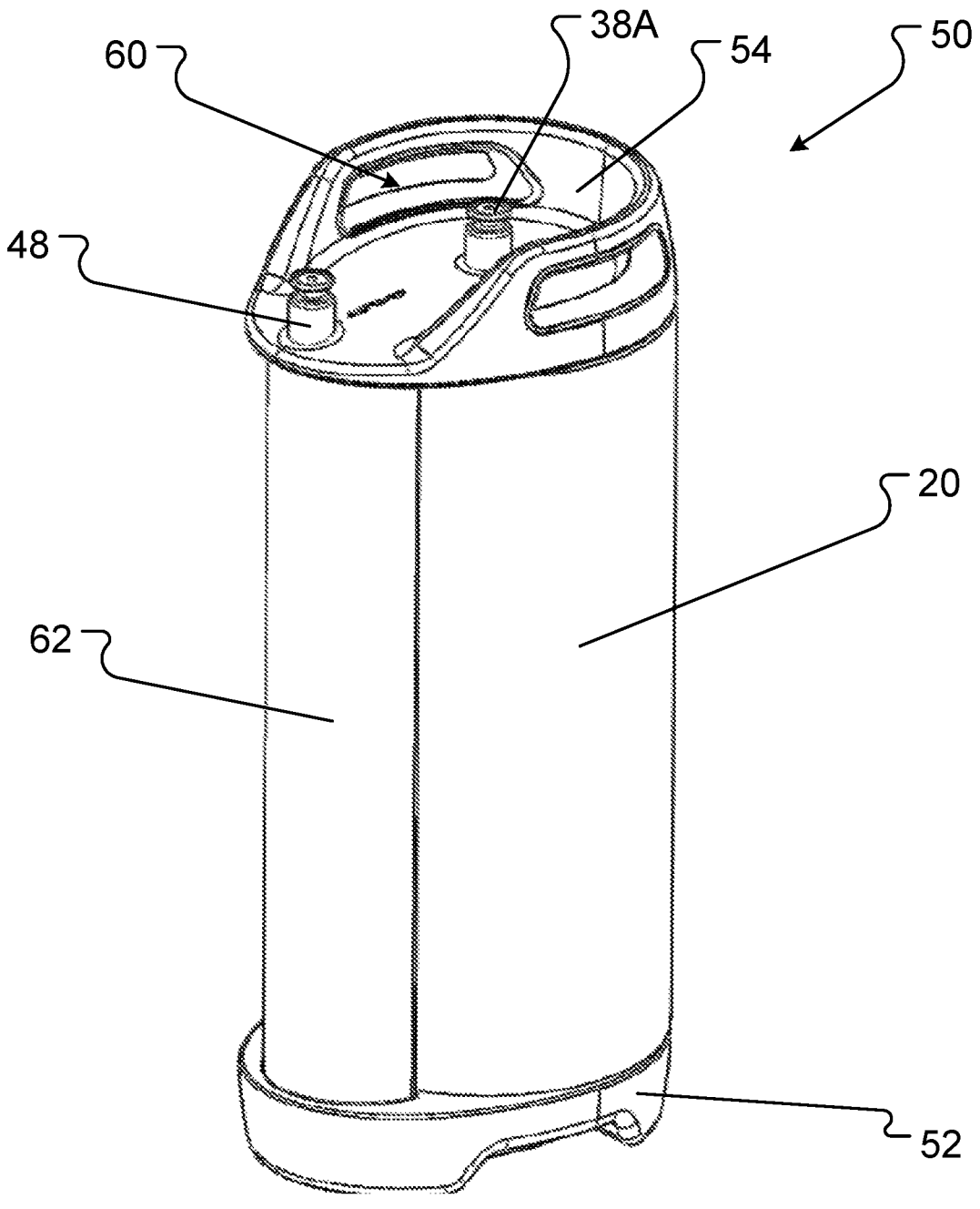
FIG. 1 is a detailed schematic diagram of a pre-packed chromatography column.

The present disclosure describes new methods and systems for removing and recovering packing media from pre-packed chromatography columns using a specifically designed packing medium recovery port. The chromatography columns can be pre-packed reusable or pre-packed disposable chromatography columns. Some users of such columns are hesitant to purchase a pre-packed column from which the packing medium, e.g., resin, cannot be recovered after use. This is most critical for large columns such as 45 cm and 60 cm columns due to the large volume of chromatography resin contained in each column. The ability to remove the packing medium in a simple, quick, and sanitary way will alleviate the economic loss if column performance has been lost and recovery of resin is the only remedy.

The column tubes are hollow, cylindrical members, which are typically round cylinders that permit a fluid (e.g., a liquid) to flow from a first end (e.g., an upper end) to a second end (e.g., a lower end), or in reverse, from the second end (e.g., a lower end) to a first end (e.g., an upper end). The inner diameter of the tubes are sized and configured to receive the flow distributors (sometimes abbreviated FD) for delivering fluid to and removing fluid from the tube. Based on various chromatography column performance specifications, the tubes can be made in a variety of different sizes and configurations and include the OPUS® line of chromatography columns (Repligen Corp., Waltham, MA) and other columns used in biopharmaceutical applications.

In general, the tubes are sized and configured to maintain structural integrity under the induced internal operating pressures of the system while being able to withstand internal pressures up to as much as about 185 psi (e.g., about 20, 30, 40, 50, 60, 75, 100, 125, 150, 175, or 185 psi). In some embodiments, the tubes are cylindrical members having an inner diameter that is about 10 cm to about 100 cm and a length that is about 10 to about 100 cm. The tubes are initially selected to be about twice as long as the desired final bed height, and, depending on the nature of the tube, can be cut shorter once both flow distributors are secured in place within the column tube.

The columns can be made entirely from metals, e.g., stainless steel, or from glass or rigid plastics, such as plastic/thermoplastics and/or composites (such as polypropylene (PP), polyethylene (PE), polyamides (such as various nylons), acetals, or glass-filled or carbon-filled plastics, e.g., glass-fiber and carbon-fiber plastics) or elastomeric components. The columns' design is such that they can be packed with various types of chromatography packing media, e.g., resins, to a "bed height" with infinite variability between 0 and 50 cm and longer. The internal diameter can be, for example, but not limited to, 10, 20, 30, 40, 50, or 60 cm or larger, up to about 80, 90, or 100 cm, or larger.

The flow distributors used in these columns are in the form of a cylindrical disc with one or more inlet/outlet openings that enable liquids to flow into and through the disc. In addition, the flow distributors can include a bed support, screen, and/or filter that is attached to the packing medium side of the flow distributor disc. The column also may or may not incorporate O-rings between the flow distributors and the inner wall of the column tube. The flow path of the flow distributors can be designed according to standard practices and known designs, and the flow distributors themselves can be made, for example, of the same or a similar plastic material as the tubes, but can also be made of metal, ceramics, and other rigid materials that are inert to the liquids and reagents that are to be flowed through the columns.

Chromatography Columns

Figure 2:
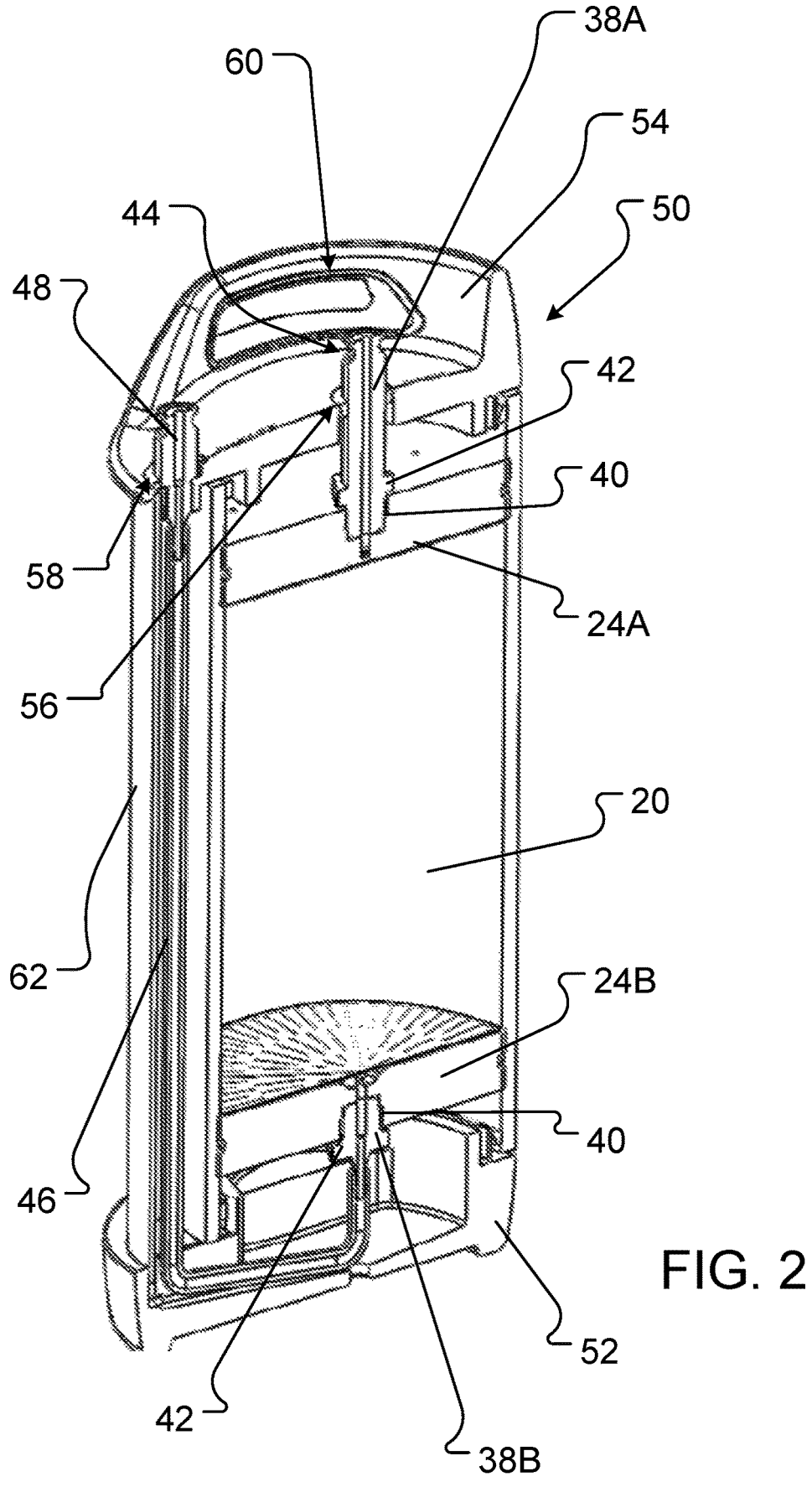
FIG. 2 is a detailed schematic cross sectional diagram of the chromatography column of FIG. 1.

As shown in FIGS. 1 and 2 a chromatography column 50 includes various parts and fittings. The fittings are mechanical attachments that can be fastened or secured to the flow distributor to deliver fluid to, or remove fluid from, a flow distributor and the tube in which the flow distributor is arranged. To deliver fluid, the fittings have a fluid delivery hole formed through the fitting along its central axis. The fittings also include one or more features to be received in the fitting hole of the flow distributor to retain the fitting. As shown in FIG. 2, in this embodiment, fittings 38A and 38B have a threaded end 40 to engage a fitting hole in flow distributors 24A and 24B.

Fittings 38A and 38B also have a nut portion 42 that can be gripped by a tool (e.g., a torque wrench) for turning and securing the fitting 38A (or 38B) within the fitting hole. In some embodiments, the fitting 38A, 38B includes other types of connection mechanisms, such as adhesive, welding, bayonet, or luer connections, or other sufficient connection techniques.

Inlet fitting 38A is installed in top flow distributor 24A and can include a connection feature at an end of the fitting opposite the threaded end. The connection feature, such as a hose connection, permits hose or tubing to be connected to the fitting in an easy manner. In this embodiment, the inlet fitting 38A defines a recess 44 that is sized and configured to be received in a hose fitting, such as a sanitary fitting (e.g., a tri-clamp connection or a cam lock) style hose fitting.

Outlet fitting 38B is connected to the bottom flow distributor 24B and can have the same or a different style connection than the inlet fitting. In this example the outlet fitting 38B is secured to a hose 46 to hydraulically connect the outlet fitting 38B to a remote quick disconnect outlet fitting 48. The remote quick disconnect outlet fitting 48 can be mounted or arranged in a region that can be more conveniently accessed by a user than the outlet fitting 38B.

The chromatography column components (e.g., the column tube 20, the flow distributors 24A, 24B, the fittings 38A, 38B, and other components) can be made from any of various structurally and chemically suitable materials. For example, the components can be made from various plastics, such as thermoplastics (e.g., acrylonitrile butadiene styrene (ABS), acrylic, e.g., polymethylmethacrylate (PMMA), polypropylene (PP), polyvinyl chloride (PVC), polytetrafluoroethylene (PTFE), other thermoplastics, or composites) and thermosetting plastics (e.g., epoxy resins and fiber reinforced plastics). Material selection considerations include the specific mechanical properties of the materials and if the materials will withstand the induced internal operating pressures of the system.

In certain specific embodiments, the column tubes can be made of sufficiently elastic metals that provide an effective induced hoop tension, such as certain steels, e.g., stainless steel, beryllium copper alloys, titanium alloys, nickel alloys, cobalt chrome, other types of metals, or alloys of these or other metals. While metals or other materials can be used, forming the tube from plastic materials can result in producing a lower cost, and in some cases, a disposable chromatography column.

In some embodiments, some, most, or all of the components (e.g., the tube, the flow distributors, and the fittings) are made from a thermoplastic and/or polyolefin material (e.g., such as polypropylene (PP), polyethylene (PE), polyamides, acetals, or glass-filled or carbon-filled plastics, e.g., glass-fiber and carbon-fiber plastics). Some of the components, such as the tube and flow distributors can be made from the same type of thermoplastic and can thus be welded to one another. For example polypropylene or an equivalent polymer can be used. The chromatography column components can be manufactured by any of a number of manufacturing processes known in the art, such as molding, casting, machining, composite tape laying, or other methods.

A chromatography column 50 can further include a base, e.g., a bottom end cap 52 that is sized and configured to suitably support and arrange the tube 20 and the other components in a generally vertical orientation. The base 52 can include various features (e.g., holes or recesses) to receive and secure a portion (e.g., the lower portion) of the tube 20. The bottom flow distributor 24B is inserted into the bottom of the tube to a depth that will permit enough volume to contain all of the slurry used to pack the column. In this example, the bottom flow distributor 24B is inserted to a depth of greater than 8 cm and less than 9 cm from the end of the tube. This will position the bottom flow distributor closest to a port 100 assembly (shown in FIG. 3A) to promote complete removal (drainage) of the media/slurry. The goal is to position the port assembly 100 close to the face of the bottom flow distributor 24B for draining and also to make sure the port assembly 100 is out of the axial/radial fluid flow path. Foot-like protrusions extending from a lower surface of the base 52 can be included to provide a substantially level supporting surface for the chromatography column 50. The bottom end cap or base 52 can also include casters or wheels in the case of larger column diameters that cannot be easily lifted and/or carried. The base 52 is made from any various structurally suitable materials, such as metals, plastics, or composite materials. The base can be made from ABS, PE, PP, or glass-filled or carbon-filled plastics, e.g., glass-fiber and carbon-fiber plastics, composite PP. In some cases, the base includes non-skid materials or features (e.g., soft rubber foot-like protrusions) to increase stability.

The chromatography column 50 can also further include a top end cap 54 that encloses the tube 20 and upper flow distributor 24A. The top cap 54 includes features (e.g., holes, recesses, or gripping elements) that receive and secure a portion (e.g., the upper portion) of the tube 20. The top cap 54 includes an inlet fitting hole 56 and an outlet fitting hole 58 that are sized and configured to receive the inlet fitting 38A and remote quick disconnect outlet fitting 48, respectively. The top cap 54 can also include one or more handles 60 that can be used to pick up and carry the chromatography column 50 or used to steer/direct larger columns that have integral casters or once placed on rolling carts/dollies. The top cap 54 can be made from any various structurally suitable materials, such as metals, plastics, or composite materials that can support the weight of the chromatography column when it is lifted by the handle. In this example, the top cap is made from ABS, PE, PP, or glass-filled, e.g., glass-fiber, plastic.

A shroud or sideguard piece 62 can also be further included. The shroud piece 62 can be sized and configured to extend from the base 52 to the top cap 54 and cover some of the inner components of the chromatography column 50 (e.g., the hose 46 connecting the outlet fitting 38B to the remote outlet fitting 48). The shroud 62 can be formed of any various suitable materials such as metals, plastics, or composite materials.

Top and bottom flow distributors 24A, 24B can be installed (e.g., press-fit) into the top and bottom of the tube 20 during the manufacturing and packing of the column and secured with permanent bonds that cannot be readily separated other than by breaking the bond or the bonded items (e.g., the tube 20 and flow distributor 24A, 24B).

At an upper end, an additional cap (e.g., the top cap) 54 can optionally be seated on and secured to the tube 20 and aligned so that the inlet fitting 38A installed on the flow distributor 24A at the top of the column passes through the inlet fitting hole 56 of the additional top end cap 54. Such optional top cap 54, which is primarily an aesthetic feature, can be secured to the tube 20 using various securement mechanisms, such as fasteners, adhesives, friction between the tube and the top cap, or other mechanisms.

At a lower end, the tube 20 can optionally be seated on and secured to the bottom cap (e.g., base) 52. The base 52 can be secured to the tube 20 using various securement mechanisms, such as fasteners, adhesives, friction between the tube and the bottom cap, or other mechanisms. When an optional base 52 is used, the outlet fitting 38B installed on the flow distributor 24B at the bottom of the tube 20 can extend into a cavity in the optional base 52 and the hose 46 connected to the outlet fitting 38B from the bottom flow distributor 24B is directed outward toward a region outside the periphery of the tube 20. As shown, the hose 46 can be routed out of the optional base 52 and upward along the side of the tube 20 to connect to the remote quick disconnect outlet fitting 48 that is fixed at or near the top of the column 50. By using the hose 46 and arranging the remote outlet fitting 48 near the top of the column 50, a user need not have access to the underside of the tube 20, which results in an easier to use chromatography column 50.

The tubes of the chromatography columns described herein can be packed with any solid phase medium material that is used in column chromatography as specified by the end-user. This diversity of potential packing medium materials extends to both the composition of base particles as well as their functional chemistries (e.g., affinity, ion exchange, and hydrophobic interaction). Packing medium materials can include a slurry of stationary phase particles added to an eluent solvent. The packing medium can include agarose, silica, ceramic, or a polymer of acrylate or cellulose-based material and other suitable materials in various particle sizes. In some embodiments the packing medium can be functionalized with one or more of the following: ion exchange groups; multimodal groups possessing hydrophobic and charged properties; metal chelate groups; hydrophobic groups; or *Staphylococcus* protein A (SpA) polypeptides capable of binding to immunoglobulin IgG. Eluents can include one or more of various solvents, such as deionized water, ethanol or acetone.

Packing Medium Recovery Port

Referring to FIGS. 3A-3C, a chromatography column 50 includes a smooth cylindrical outer shell or tube 20 that encloses the interior of the chromatography column 50. There is a through-hole 22 on the tube 20 at a height located between the top flow distributor 24A and a bottom flow distributor 24B and a recovery port assembly 100 is positioned at the through-hole 22. In FIGS. 3A-3C, the port assembly 100 is shown at a height of approximately 21 cm from the bottom of the tube (on a 45 cm column), however this height can be less than 21 cm. The goal is to position the port assembly 100 close to the bottom flow distributor 24B.

Figure 4:
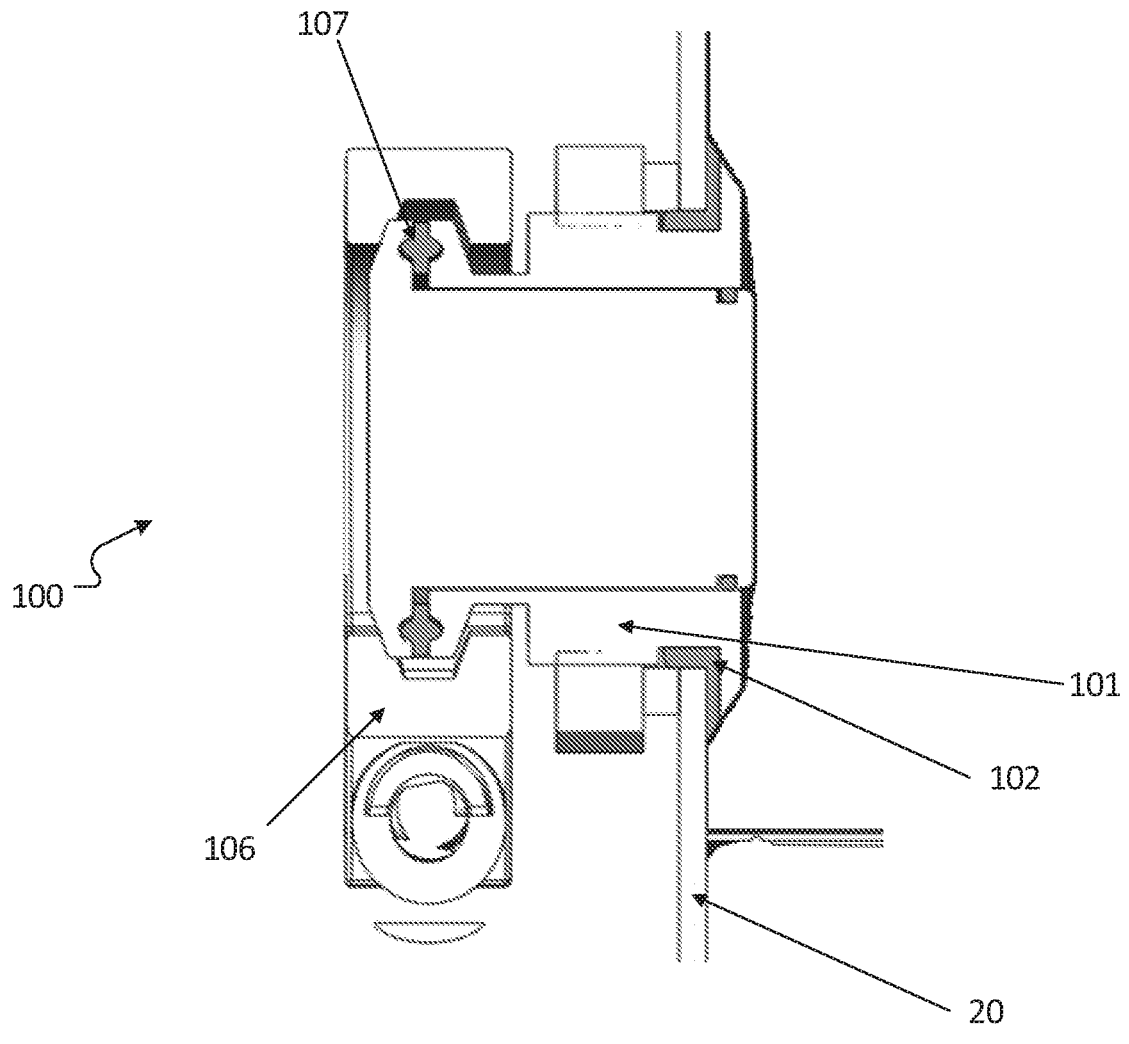
FIG. 4 is a detailed view highlighted in FIG. 3A from the side cross section showing the packing medium recovery port assembly attached to the side of the chromatography column.

FIG. 4 shows an enlarged side view of the port assembly 100 within the image portion circled in FIG. 3A. FIG. 4 shows the port assembly 100 embedded in the wall of the tube 20. The port assembly includes a port 101 that is embedded in the wall of the tube 20, with one end (the Tri-clamp end with sanitary clamp 106) sticking out from the wall, and the inside end 102 (with gasket 102) on the inside of the wall and inside the tube 20.

Figure 5:
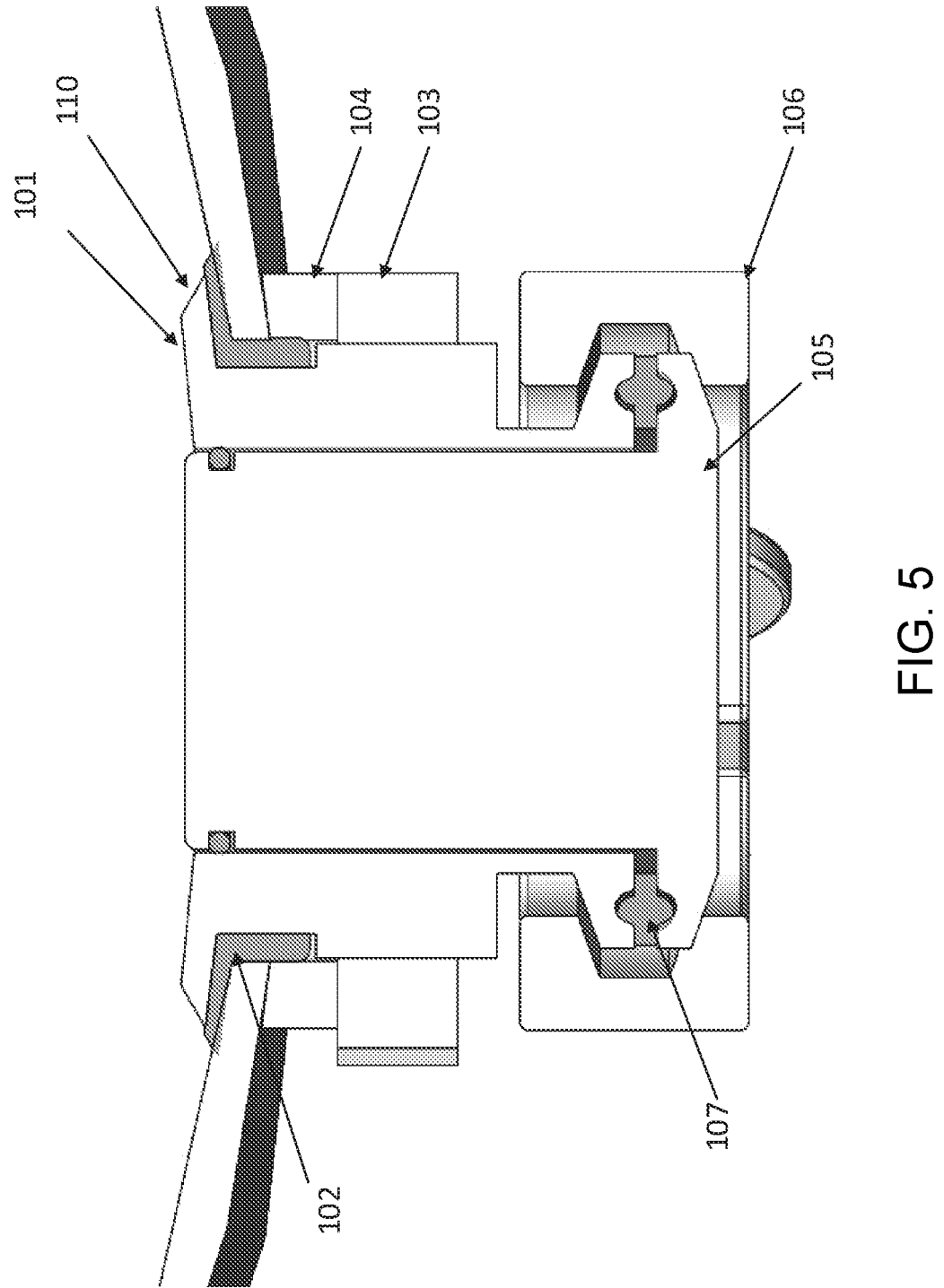
FIG. 5 is a detailed side cross-sectional view of the packing medium recovery port assembly as viewed from a cross-section from above.
Figure 6:
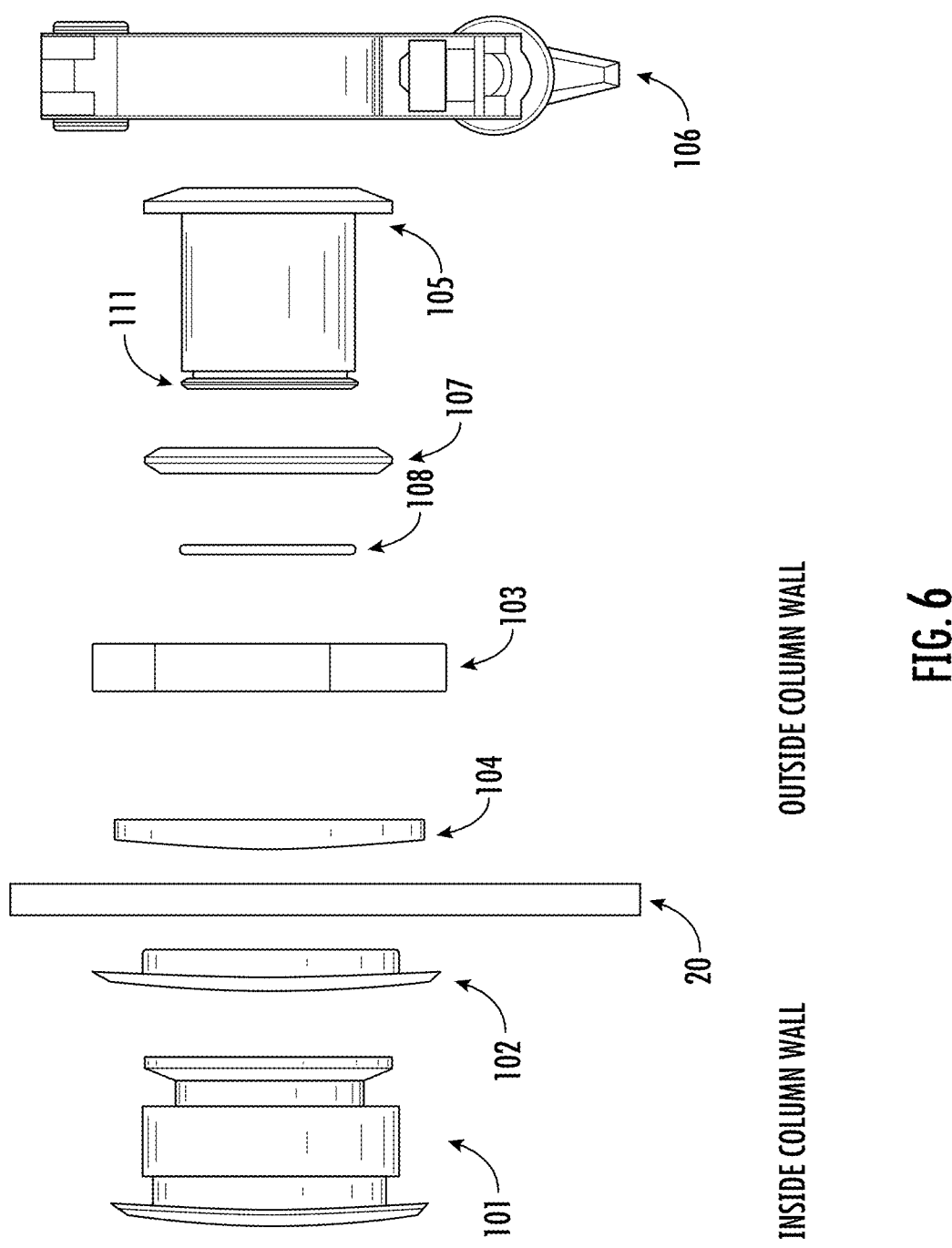
FIG. 6 is an exploded side view of the packing medium recovery port assembly.

FIGS. 5 and 6 show the port assembly 100 including a beveled flange 110 (best shown in FIG. 5) of cylindrical port 101, with a larger outside diameter than the fitting on the inner end. This port 101 can be machined from rigid plastic, such as polypropylene. The body of the port 101 is threaded from the fitting, e.g., Tri-clamp fitting, end to the flange 110. As shown in FIG. 5, the flange 110 is beveled to minimize intrusion into the packed medium bed in the column and the bevel is configured to permit liquid inside the column tube to flow smoothly by the port without creating significant eddy currents.

As seen in FIGS. 4, 5, and 6, a gasket 102, e.g., a silicone grommet gasket, is arranged around the body of the port 101 to be sandwiched between the flange 110 and the wall of the tube 20.

The port 101 is installed through a machined through-hole 22 in the tube 20 from the interior. As shown in FIGS. 5 and 6, a washer 104, e.g., a polypropylene or acrylonitrile butadiene styrene (ABS) washer, is then placed on the body of the port 101 that projects through the through-hole 22 to the exterior of the column tube 20. A port nut 103, which can also be made of polypropylene or ABS, is then threaded onto the body of the port 101 and tightened to secure the port assembly 100 to the wall of the tube 20.

The port 101 is sealed with a plug 105 that can be machined from plastic, e.g., polypropylene or other rigid plastic, to match the dimensions of the end cap at an outer end after which the diameter is decreased to match the dimensions of the through hole in the port 101. A groove 111 is machined onto the end of the plug 105 opposite the Tri-clamp end for a plug O-ring 108, e.g., made of silicone. This O-ring prevents leakage of packing medium past the inner end of the plug into the opening of the port, which could create areas that are potentially hard to clean (e.g., dead zones).

The end of the plug is sealed against the outer end of the port 101 with a gasket, e.g., a silicone or ethylene propylene diene monomer (EPDM) gasket 107. A clamp 106, e.g., a polypropylene clamp (such as a 1.5" SaniSure® clamp), is used to seal the plug tube adapter 105 to the fitting of the port 101 to prevent the plug 105 from dislodging from the port 101 under pressure. In general, all materials that are in contact with any fluids inside the chromatography column should be USP class VI.

The port assembly 100 is designed that when embedded into the side of the chromatography column tube 20, the entrenchment of the port into the fluid flow inside the column is minimized. Minimizing the projection of the port into the fluid flow reduces the resulting eddies generated by the port as the fluid flows along the inside of the column. As shown in FIG. 5, the projection can be 6 mm or less, however, a smaller or greater projection is possible. For example, the projection of the port into the chromatography column tube 20 can be less than 8 mm or less than 6 mm, for example less than 4 mm, or less than 3 mm.

The design of the port assembly 100 is such that it will not affect the internal dynamics of the column. The flange 110 and gasket 102 are minimized in thickness to reduce the overall radial footprint of the port assembly 100, to e.g., <5.0 mm of radial footprint or <1.0% of the diameter. The flow distributors 24A and 24B have a porous mesh ultrasonically welded to its face to contain the media inside the column. The mesh is welded a small distance, e.g., 5.0 mm, in from the outer edge of the flow distributor 24B, so a port assembly 100 that does not protrude more than 5.0 mm into the column and is positioned at the edge of the flow distributor 24B, will have the least effect on the dynamics of the fluid inside the column. The geometry of the flange 110 is also such that it will promote laminar flow. Chamfers or bevels are added to the edge of the flange 110 to allow smooth fluid movement across and past the port assembly 100.

In addition, the design of the port assembly 100 includes a smooth profile of the port inside the column, in the form of bevels of the flange 110 that is presented to the fluid flow. This smooth profile contributes to maintaining a desired laminar flow inside the column (e.g., flow that is not turbulent and prone to eddies). The smooth profile also ensures that the fluid inside the columns does not have any "dead zones" (e.g., locations of stagnant, or zero velocity flow) that may allow bacteria to proliferate.

Methods for Removing and Recovering Packing Media

Figure 7:
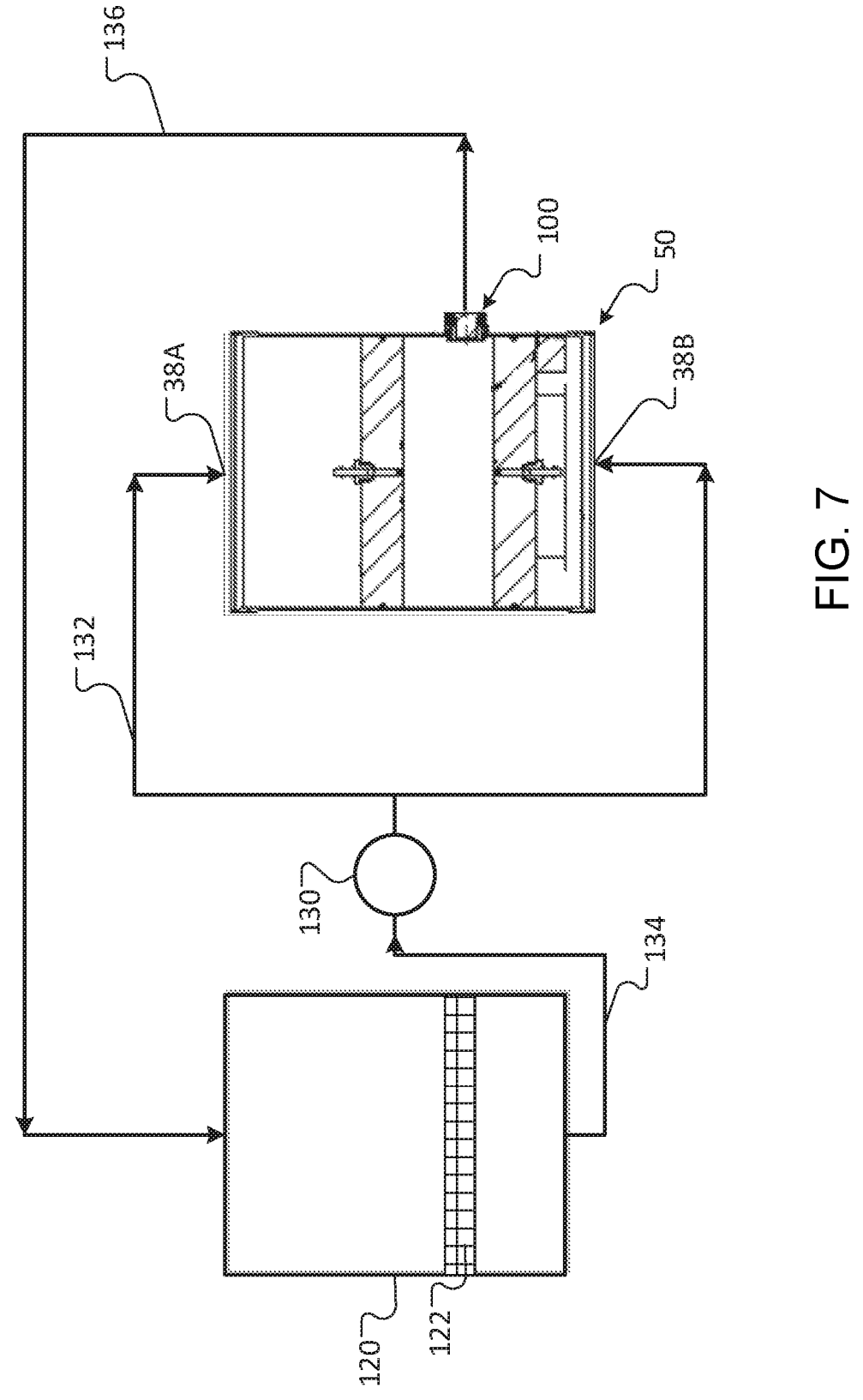
FIG. 7 is a schematic fluid-flow diagram of one embodiment of a system for recovering packing medium from a chromatography column via a packing medium recovery port assembly.

The port assembly 100 is easy to use. During normal use of the chromatography column 50, the clamp 106 is in place, and the interior of the chromatography column 50 is not fluidly connected to the exterior of the tube 20 via the port assembly 100. Referring to FIG. 7, when a user wishes to remove the packing medium, e.g., resin, from the chromatography column 50, the user attaches a pump 130 (e.g., a positive displacement pump} via a pressure line 132 to both a column inlet fitting 38A and outlet fitting 38B (which were in use during normal operation of the chromatography column 50). The user then can remove the sanitary clamp 106 and plug 105 from the port assembly 100, and attach tubing 136 for resin collection. The tubing 136 is routed to an inlet of the resin recovery tank 120.

The pump 130 forces buffer (e.g., water) into the chromatography column 50, causing resin to flow out of the resin recovery port assembly 100 under pressure and into the resin recovery tank 120. As is shown in FIG. 7, the buffer is pumped by pump 130 to flush the chromatography column 50 from the top and bottom simultaneously, forcing liquid in the chromatography column 50 out the port assembly 100 as the only possible path of fluid flow. This pumping procedure can be fast, e.g., 5, 10, 15, 20, 25, or 30 liters/min, allowing a column to be emptied in a matter of minutes without loss of integrity or functionality of the packing medium.

In some embodiments, it is possible to recover up to 100% of the used resin from the chromatography column 50. Resin is collected via a mesh 122, and can be removed from the resin recovery tank 120 once flushing of the chromatography column 50 is complete. The mesh can be located within the recovery tank 120, or at the entrance of the recovery tank 120. At this stage, the resin can be reused.

In some embodiments, the volume of buffer (e.g., waste water) used to empty the chromatography column 50 of resin can be reduced by recycling the buffer. Once the resin is sieved out through mesh 122, the filtered aqueous buffer can be cycled through the chromatography column 50 again via an outlet of the resin recovery tank 120 and pump 130 back to the chromatography column 50.

In some embodiments, aqueous buffer, as well as air can be introduced into the chromatography column 50 from the bottom outlet fitting 38B. As a result, bubbles will form and bubble up through the chromatography column 50, agitating the resin and thus increasing the level of fluid transport from the bottom of the column. This technique can improve efficacy and speed of the procedure.

The steps in methods for removing resin from the chromatography column 50 via port assembly 100 are shown in the flow chart of FIG. 8. In step 200, when the user is ready to begin resin recovery, the user plumbs tubing from a reservoir of aqueous solution to a pump 130 with tubing 132 split after the pump to connect feed lines to the column inlet and outlet ports 38A, 38B. The user then removes a protective sideguard 62, if present, from the column to expose the port assembly 100, step 210. In step 220, the user removes the sanitary clamp 106. In step 230, the user plumbs tubing 136 from the port assembly and diverts the tubing 136 back to the reservoir of aqueous solution (e.g., the recovery tank 120) to catch resin on the mesh 122. In step 240, the user pumps buffer from solution from the recovery tank 120 reservoir into the column until the resin is displaced and recovered in the tank.

Figure 9:
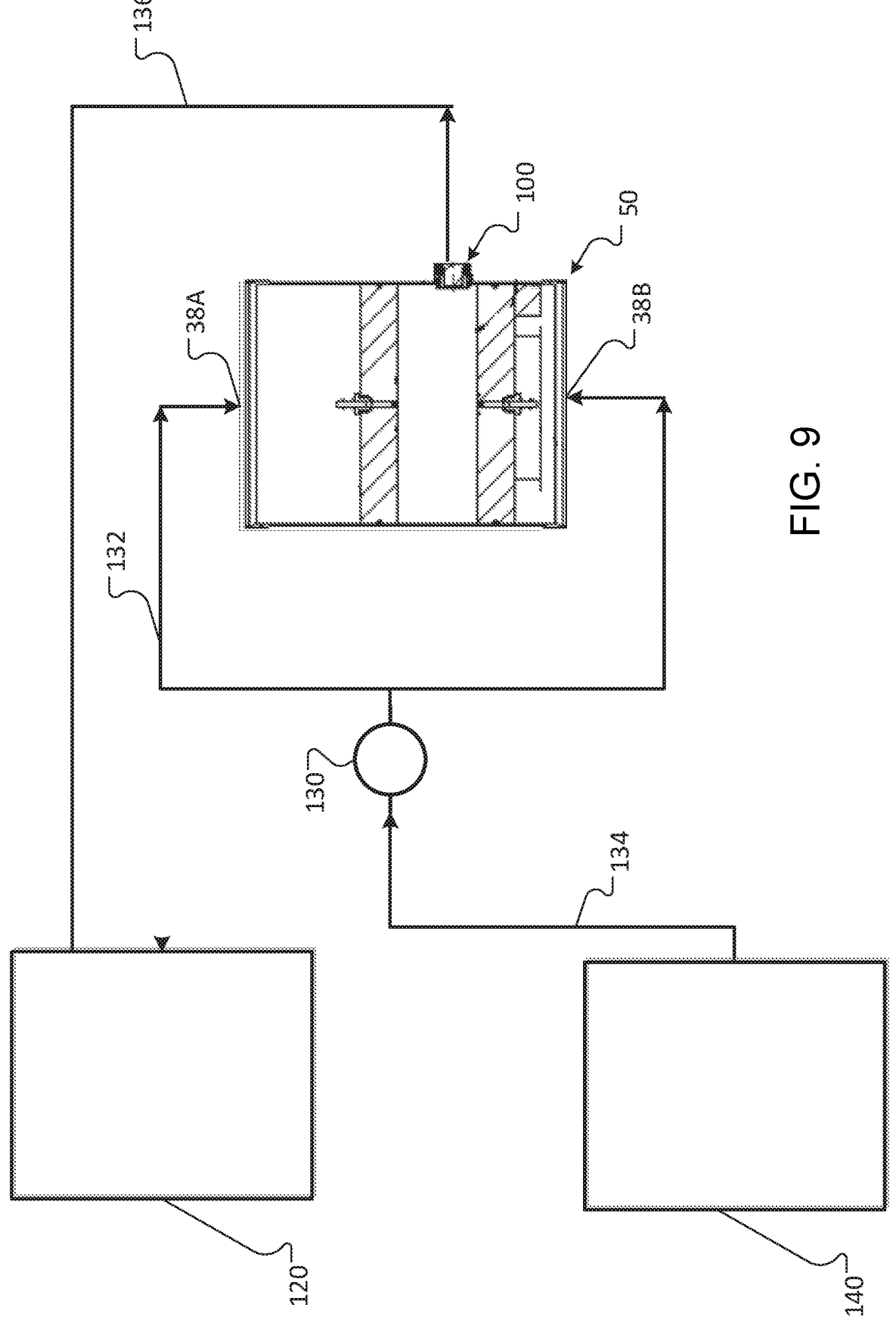
FIG. 9 is a schematic fluid-flow diagram of another embodiment of a system for recovering packing medium from a chromatography column via a packing medium recovery port assembly.

In an alternate embodiment shown schematically in FIG. 9, rather than using recovery tank 120 to both supply buffer and collect the resin, recovery tank 120 is used only to collect resin emptied from the chromatography column 50, while reservoir tank 140 supplies buffer for removing the resin from the chromatography column 50. The process is similar to the process in the embodiment described above, however buffer (e.g., water) is not cycled through the recovery tank 120 and the chromatography column 50, and instead travels by the action of pump 130 from the reservoir tank 140, along suction line 134 and pressure lines 132 into the chromatography column 50, then out via port assembly 100 and along tubing 136 to collect in recovery tank 120.

The steps for removing resin from the chromatography column 50 via port assembly 100 using the configuration shown in FIG. 9 are shown in the flow chart of FIG. 10. In step 200, when the user is ready to begin resin recovery, the user plumbs tubing from a reservoir of aqueous solution (e.g., reservoir tank 140) to a pump 130 with tubing 132 split after the pump to connect feed lines to the column inlet and outlet ports 38A, 38B. The user then removes a protective sideguard 62, if present, from the column to expose the port assembly 100, step 310. In step 220, the user removes the sanitary clamp 106. In step 235, the user plumbs tubing 136 from the port assembly and diverts the tubing 136 to a sufficiently-sized recovery tank 120 (e.g., recovery tank 120 with large enough volume to include the recovered contents of the chromatography column 50 and the buffer solution required to flush the column. In step 230, the user pumps buffer solution from the reservoir tank 140 into the column until the resin is displaced and recovered in the recovery tank 120.

Figure 11:
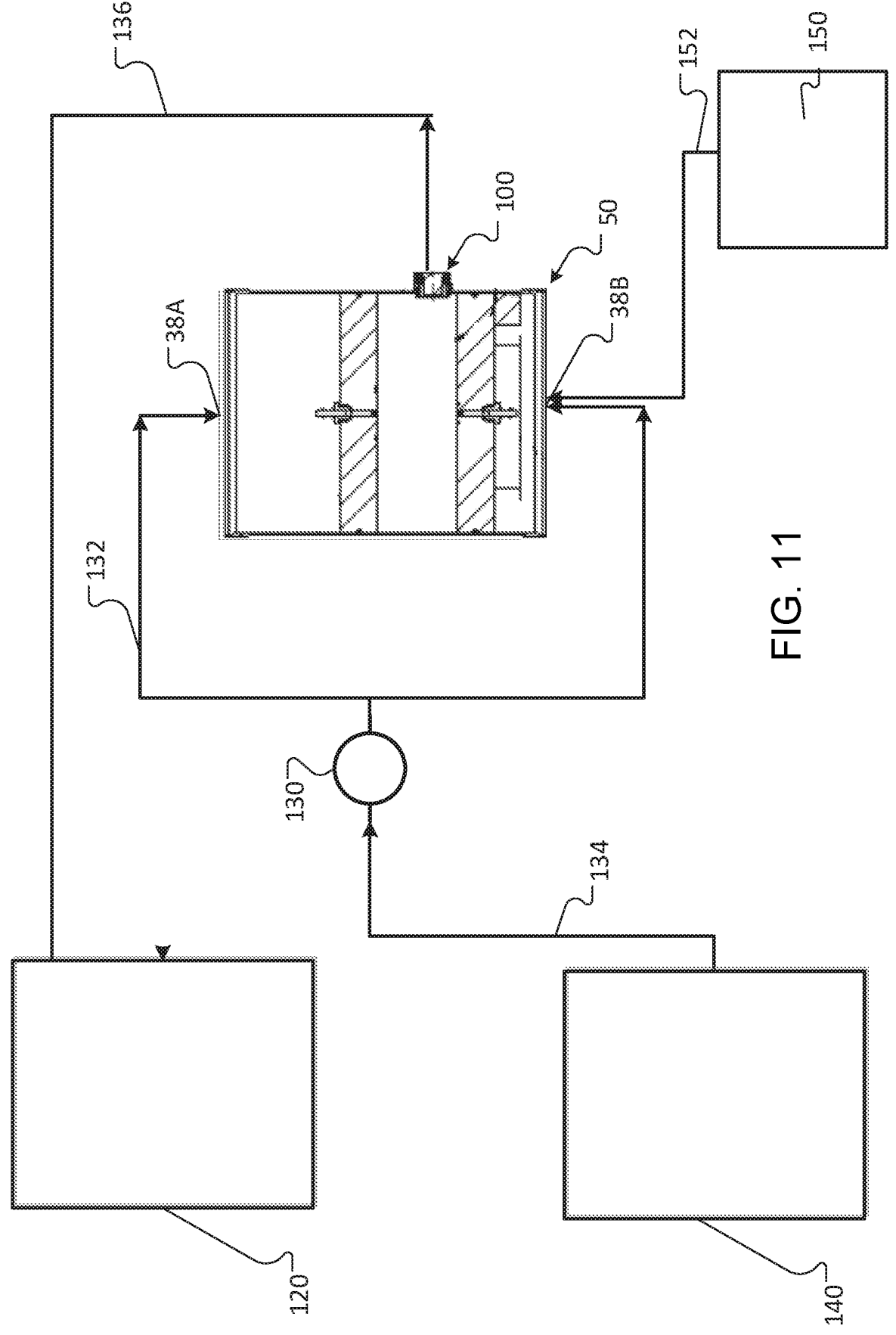
FIG. 11 is a schematic fluid-flow diagram of another embodiment of a system for recovering packing medium from a chromatography column via a packing medium recovery port assembly.

In an alternate embodiment shown schematically in FIG. 11, both buffer from a reservoir tank 140 that supplies buffer as well as air from an air source 150 are used for removing the resin from the chromatography column 50. A recovery tank 120 is used to collect resin emptied from the chromatography column 50.

The process is similar to the process in the embodiment described above, with buffer (e.g., water) travelling by the action of pump 130 from the reservoir tank 140 along suction line 134 and pressure lines 132 into the chromatography column 50, then out via port assembly 100 and along tubing 136 to collect in recovery tank 120. Additionally, air or other sterile gas can be supplied from air source 150 and delivered to the chromatography column 50 (e.g., the column outlet port 38B) via tubing 152. Air is pumped into column, causing both buffer and resin remaining in the tank to exit via port assembly 100 and along tubing 136 to collect in recovery tank 120. If desired, additional buffer can then be pumped from the reservoir tank 140 along suction line 134 and pressure lines 132 to refill the chromatography column 50, suspending any particulates in the column disrupted by the air flow. Once filled, the air can be pumped again from air source 150, forcing the buffer and resin out via port assembly 100 and along tubing 136 to collect in recovery tank 120 once again. These steps of refilling the column 50 with buffer and evacuating the column 50 with air can be repeated if desired.

Air from air source 150 can flow into the column 50 through both the inlet 38A and outlets 38A at the same time. This air travels through the center holes of each flow distributor 24A, 24B and enters the column. The air then bubbles through into the chamber containing the previously pumped fluid and the media. The bubbling disrupts the packed bed and mixes the media into solution to help it exit the side port 100. The air inflow mixes turbulently in the column helping to create mixing of the particles and liquid in the column.

Figure 12:
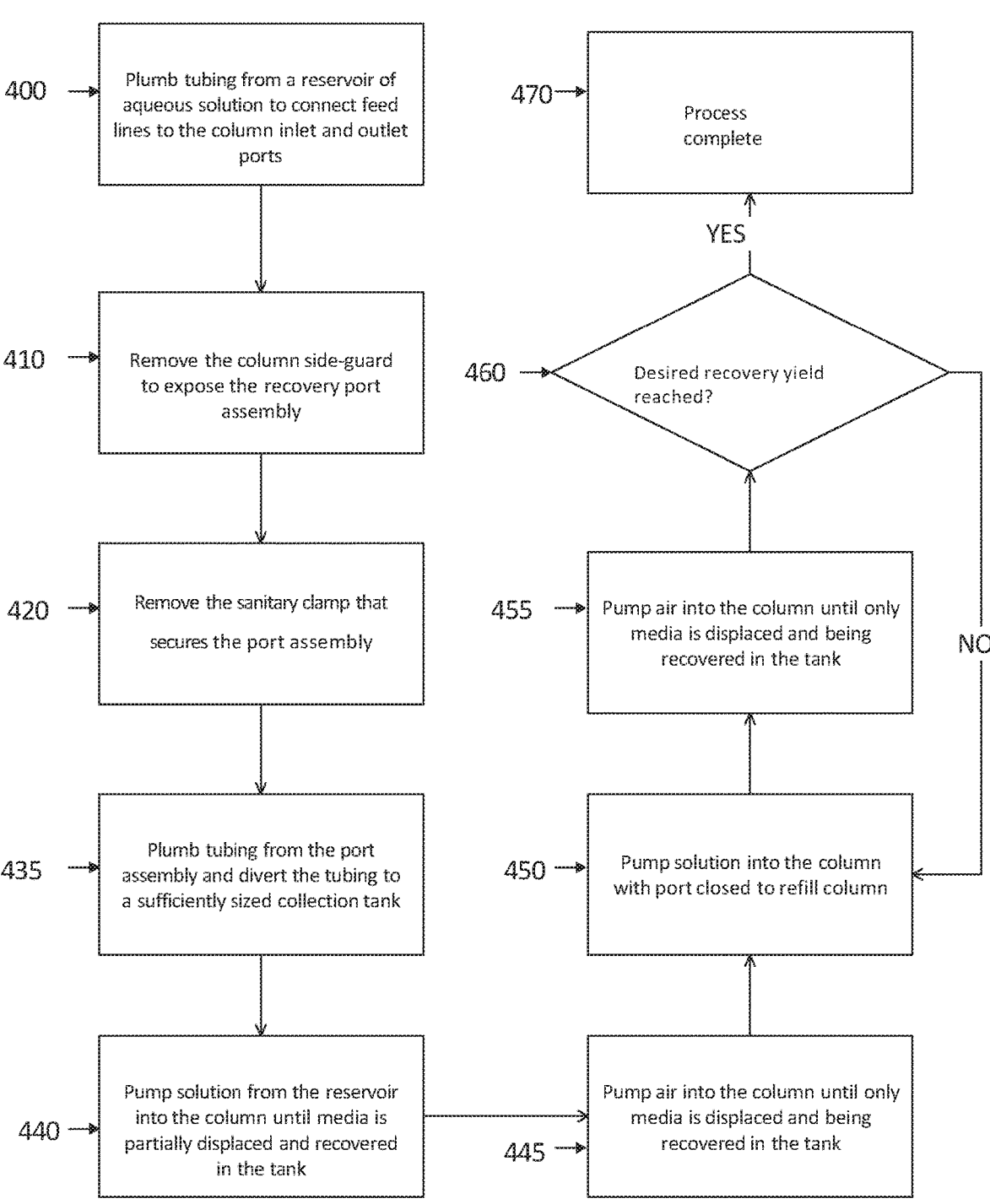
FIG. 12 is a flow chart for another embodiment of steps used to recover packing medium from a chromatography column system, e.g., as shown in FIG. 11.

The steps for removing resin from the chromatography column 50 via port assembly 100 using the configuration shown in FIG. 11 are shown in the flow chart of FIG. 12. In step 400, when the user is ready to begin resin recovery, the user plumbs tubing from a reservoir of aqueous solution (e.g., reservoir tank 140) to a pump 130 with tubing 132 split after the pump to connect feed lines to the column inlet and outlet ports 38A, 38B. The user then removes a protective sideguard 62, if present, from the column to expose the port assembly 100, step 410. In step 420, the user removes the sanitary clamp 106. In step 435, the user plumbs tubing 136 from the port assembly and diverts the tubing 136 to a sufficiently-sized recovery tank 120 (e.g., recovery tank 120 with large enough volume to include the recovered contents of the chromatography column 50 and the buffer solution required to flush the column. In step 440, the user pumps buffer solution from the reservoir tank 140 into the column until resin is displaced and recovered in the recovery tank 120.

Then the user pumps air from an air source 150 into the column at step 445, e.g., directed as a jet of air. The air disrupts the media that is in the tank, moving through pores created by the solution pumped into the column at step 440. The air is pumped, pushing media out through the port, until only air is being delivered to the recovery tank. Then the port fluid path is closed off (e.g., with a valve) and the column is refilled with solution from the reservoir, step 450. Filling re-suspends any media remaining in the column, and then the port is opened and air is once again pumped into the column forcing the media out through the port, step 455. If the desired recovery yield of resin in the recovery tank (measured through various sensors and diagnostics) is reached, step 460, then the process is complete at step 470. If the desired yield is not reached, then step 450 is repeated, filling the column with media followed by step 455 of purging the column with air. Steps 450 and 455 are repeated until the desired yield (step 460) is reached. In some embodiments, the resin yield in the recovery tank 120 is measured to determine when the desired yield is reached. In some embodiments, a number of repetitions of steps 450 and 455 determine that desired yield has been reached (e.g., 2 repetitions, 3 repetitions), or a number of column volumes has been used (e.g., 2 CVs, 3 CVs).

Alternative Designs for Removing and Recovering Packing Media

In some embodiments a combination inlet/recovery port is possible. The port would be installed in a redesigned flow distributor which would have a through-hole machined into the center. When the port is installed in the fully down position (installation shown in FIG. 13B) the through-flow would be forced through the mesh only during column operation. Resin recovery would be performed by retracting the port to expose the through hole in the flow distributor.

This would allow resin to bypass the mesh. Liquid could then be pumped through the column outlet and resin would flow out of the column via the retracted inlet port (resin recovery installation shown in FIG. 13C).

Figure 13A:
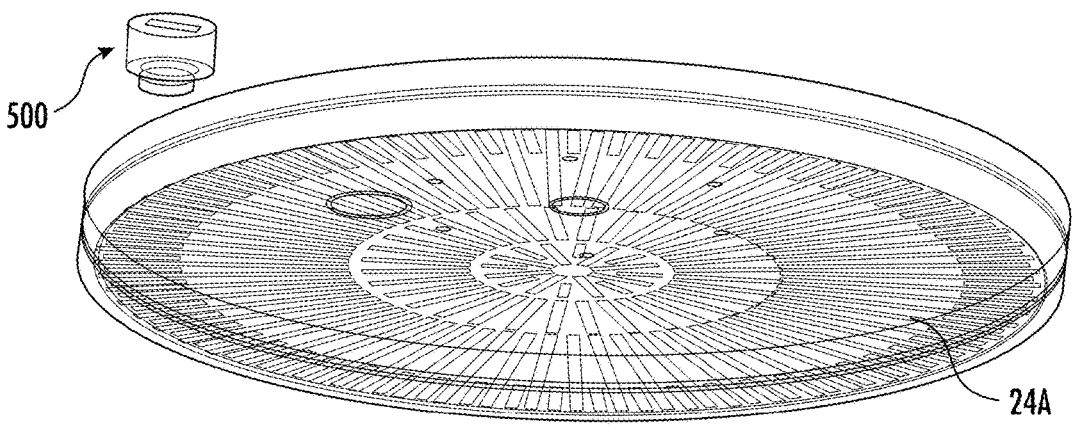
Figure 13B:
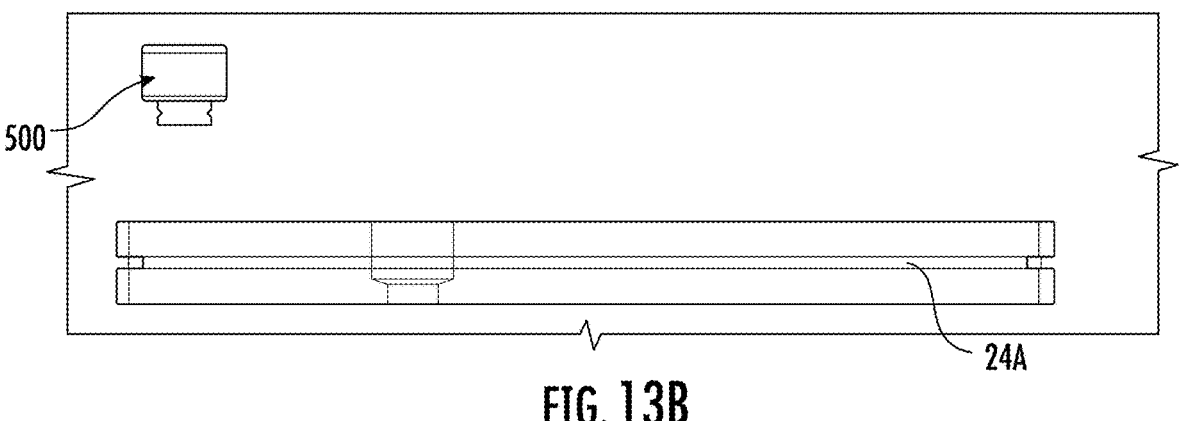
Figure 13C:
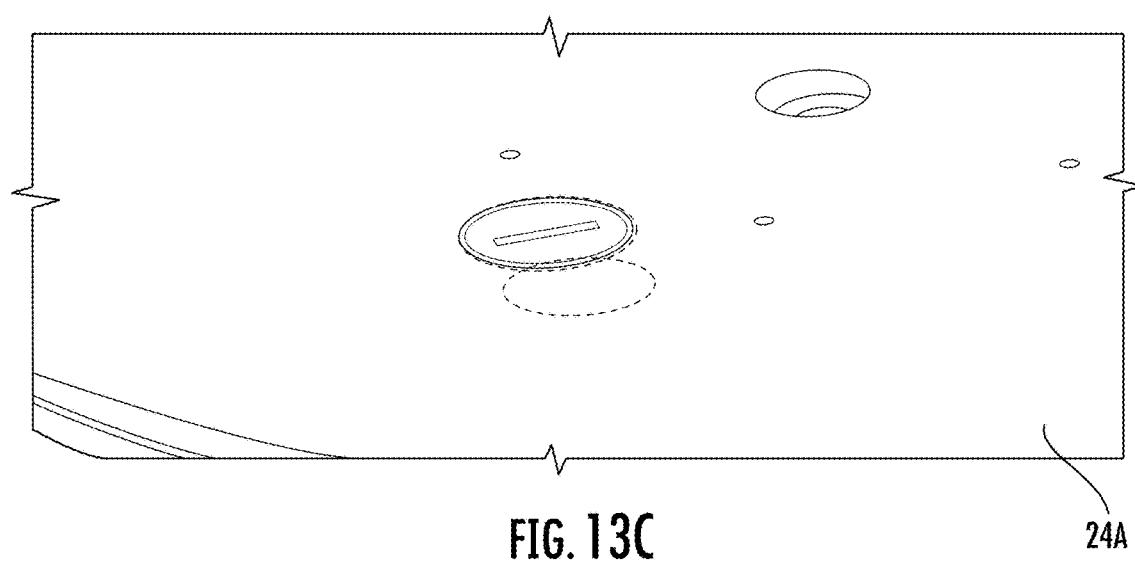
Figures 14A, 14B, 14C, 14D:
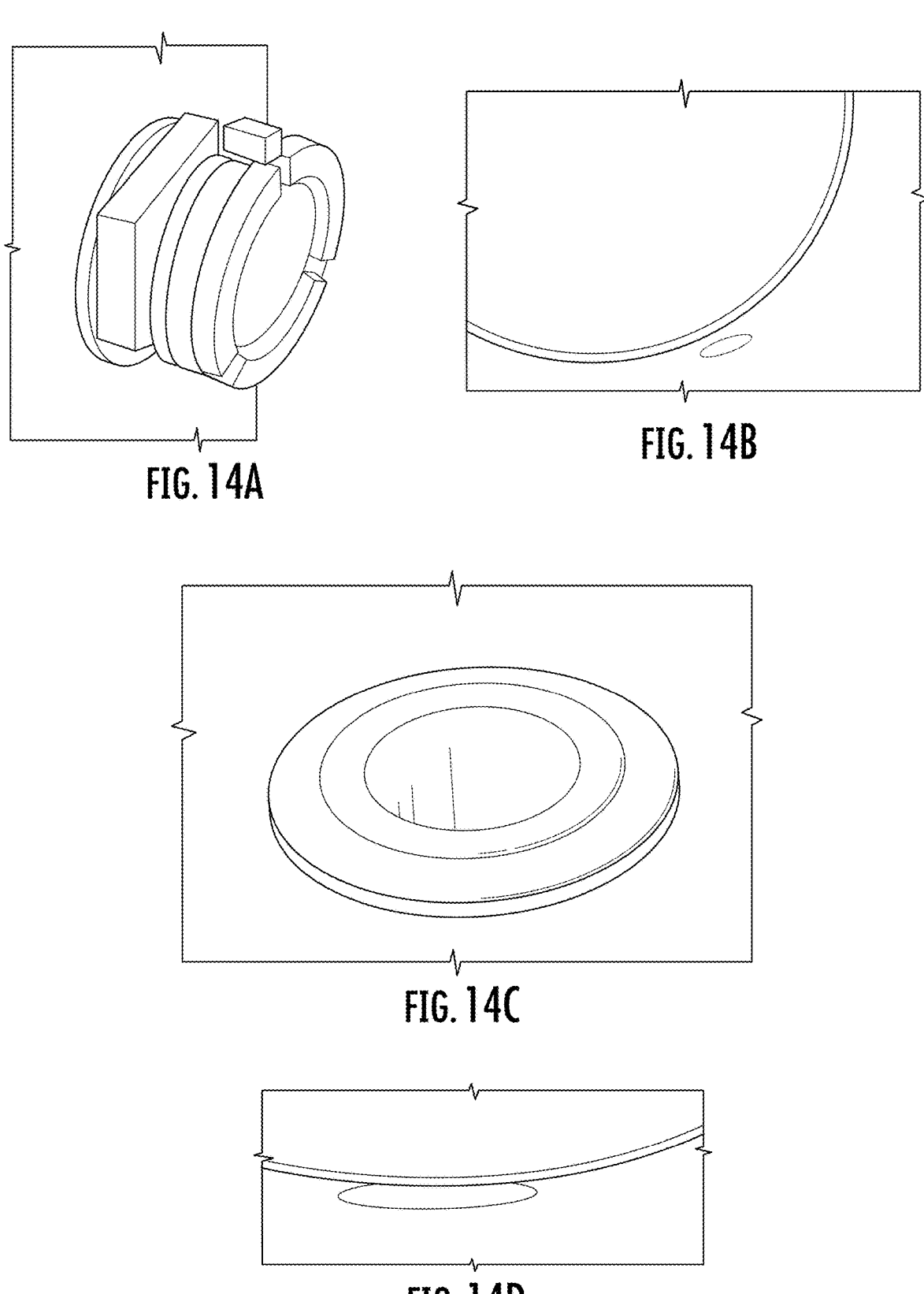
FIGS. 14A-D are components of the chromatography column system assembled for pressure testing.

Another option to remove resin that would be non-destructive to the column and prevent resin contamination includes a removable plug 500 in the flow distributor (shown in FIG. 13A). This plug 500 could be installed in the top or bottom flow distributors. Liquid could then be pumped through the column inlet and/or outlet ports and resin would flow out of the port.

EXAMPLES

The following examples illustrate, but do not limit, the systems and methods described herein.

Example 1—Pressure Testing Assembly with Side Port

FIGS. 14A-D show details of the components involved in the design of the column with a hole and side port that was pressure tested. An assembly was built with the bottom flow distributor 24B inserted 9.0 mm in the tube, measured from the bottom of the tube to the face of the flow distributor, and the port was installed in the side wall of the tube. The bottom flow distributor was contained in the tube with 3 adhesive wedges glued to the tube wall with adhesive.

A top flow distributor 24A was inserted into the tube and the assembly was pressurized to 90 PSI. This test demonstrated that the column with a side port is integral and can contain pressure to a two-fold factor of safety (FOS) above the maximum rated operating pressure for this assembly, which is 45 PSI.

Example 2—Numerical Simulation of 45 cm Column Fluid Dynamics with and without a Port Computational Fluid Dynamics (CFD) was utilized to simulate the fluid flow through the column both with and without a port on the side wall of the column. The 45 cm column was considered the worst case for this application, because it had a smaller internal diameter and the port would represent a larger percentage of the internal diameter compared to the 60 cm column. This meant that the port would potentially impact a larger portion of the fluid path in the 45 cm column.

The model considered an axisymmetric volume of the column, dividing it in half and breaking it into 4,516,230 cells. Fluid came in through the top mesh and left out the bottom mesh. The bed was treated as a porous media with a volume of 32.82 L (20 cm bed height) and the fluid velocity through the column was tested at steady state 100 cm/hr. This simulation looked at the time it would take (volume changes) to exchange fluid in the column from a concentration of 1 to a concentration of 0. This is representative of a typical column operation.

Figure 18A:
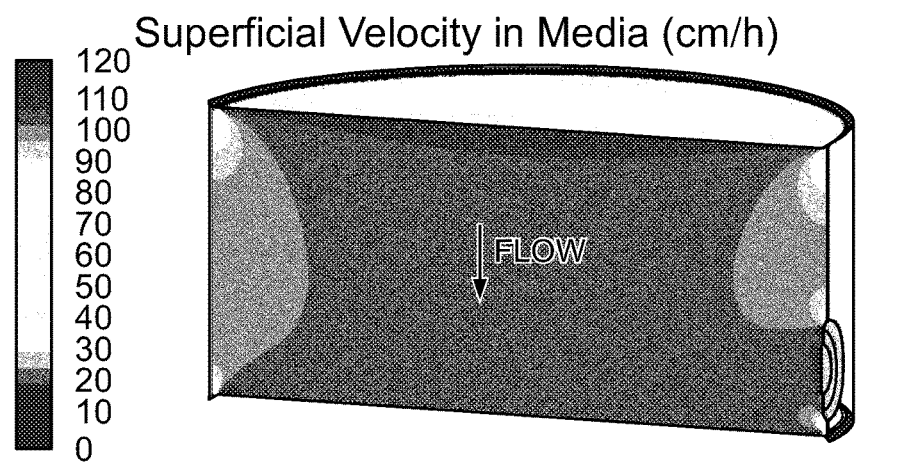
FIGS. 18A-C display results from CFD modeling of fluid flow through the column with the port and comparison of necessary volume to flush fluid out of the column with and without a port.
Figure 18B:
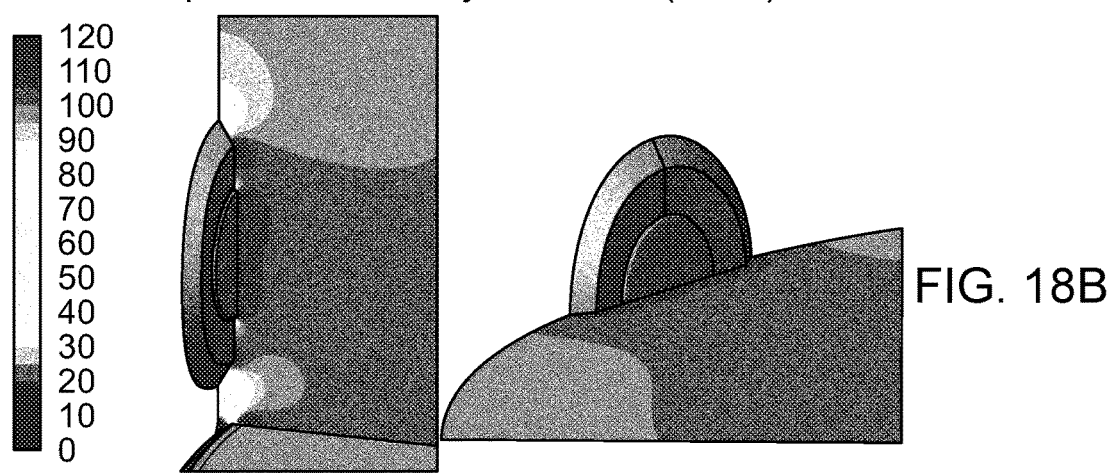
Figure 18C:
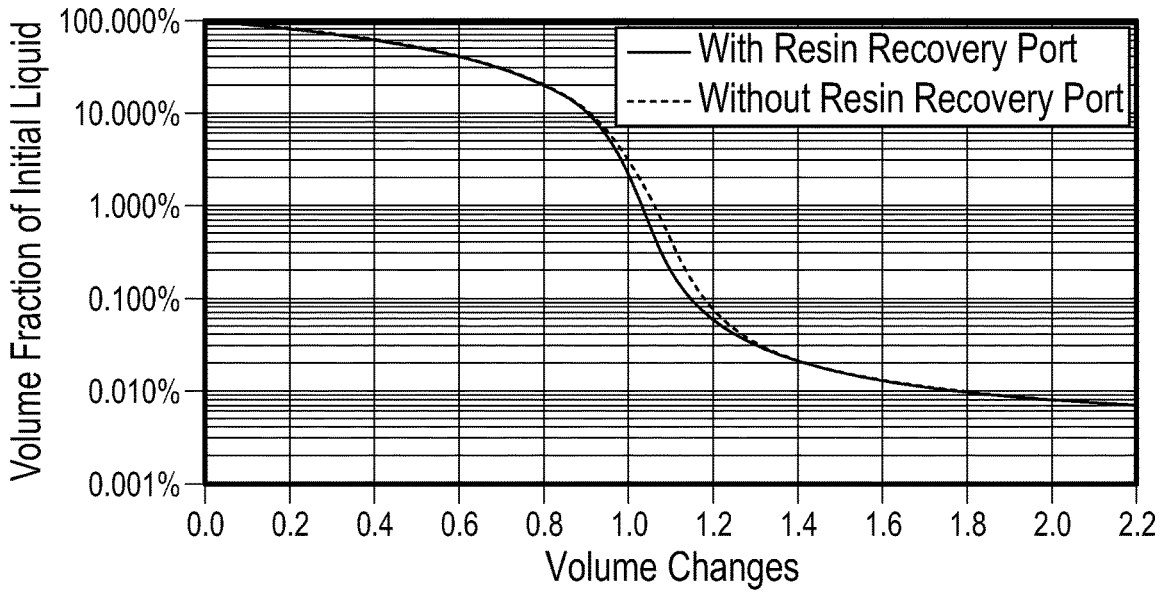

FIGS. 18A and 18B look at the local fluid velocities throughout the column space. This test assumed 100 cm/hr fluid velocity traveling through the column. FIG. 18A presents the fluid velocity through a cross section of the column. FIG. 18B shows the detailed fluid velocity through two different vertical and horizontal cross sections around the port inside the column. FIG. 18C shows a logarithmic graph of the volume fraction of fluid in the column versus column volumes flushed through the column, that is the amount of volume changes (in this case a 20 cm bed height and 45 cm diameter) to change the inner fluid concentration from 1 to 0. In this case this resulted in a 100 fold decrease in concentration. The results show that the resin recovery port has no detrimental impact on purging the column compared to a column without a port.

The port is purposely designed to be flat so that it won't disrupt "plug flow" conditions. Bevels are added to the flange and gasket around the inner perimeter of the port to reduce any impact to fluid flow in the column.

Example 3—Flow Properties of a Column with and without a Port

Port design and placement within the column tube results in flow properties and chromatographic performance attributes that are unchanged in comparison to a non-modified column. This was demonstrated through the standard packed column efficiency test method, namely determination of theoretical plates and asymmetry. Size exclusion resolution testing using molecular weight markers was also performed to further confirm performance. OPUS® columns with and without the packing port were packed with Sepharose® 6FF resin each at dimensions of 45 cm inner diameter×20 cm height. Efficiency testing was performed by injecting 1% bed volume of a 2% acetone solution. The mobile phase consisted of 0.1M NaCl and was run at a 100 cm/h linear velocity.

TABLE 1

| Column Efficiency | | |
|---|---|---|
| | Plates/m @ 100 cm/h | Asymmetry @ 100 cm/h |
| Standard Design | 2636 ± 200 | 1.1 ± 0.1 |
| Recovery Port Design | 2661 | 1.2 |

Figure 15A:
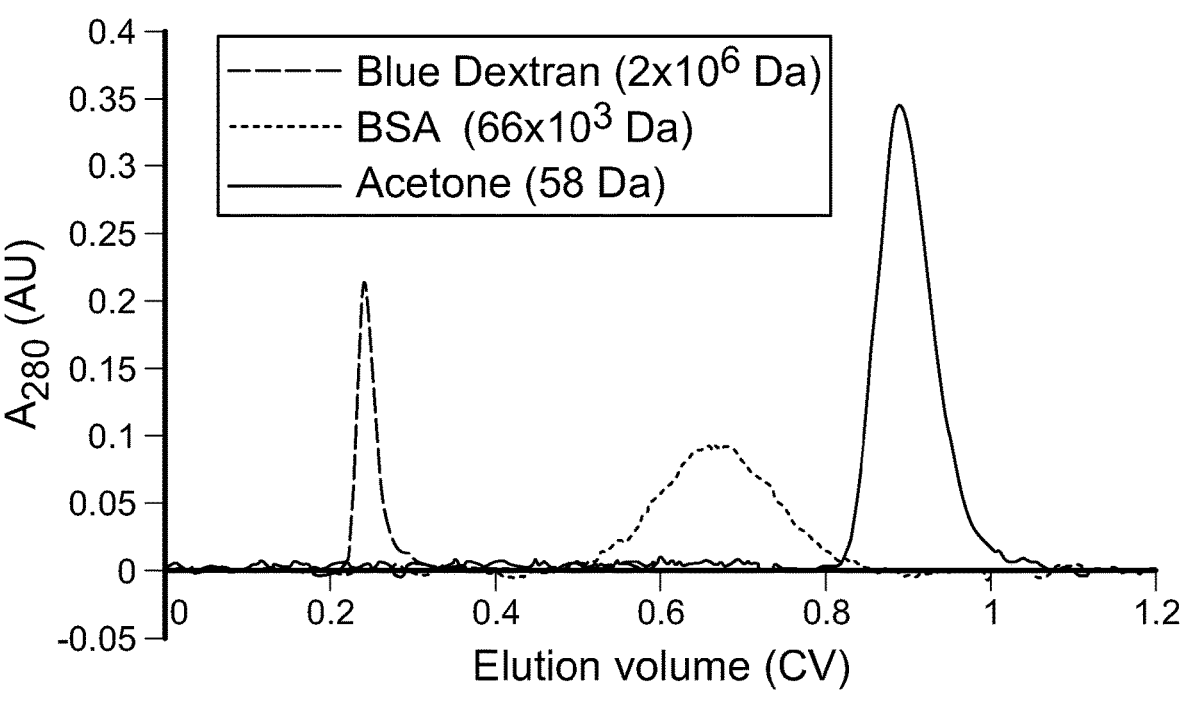
FIGS. 15A and B are examples for a size exclusion chromatography test showing flow characteristics in a standard pre-packed column (FIG. 15A) and a column with a resin recovery port (FIG. 15B).

High molecular weight dextran (Blue Dextran—Sigma cat #D5751), bovine serum albumin (BSA) and acetone were used as size exclusion chromatography (SEC) molecular weight markers. Dextran represents the excluded fraction, BSA the partially included and acetone the fully included volume. Each were injected at 1% bed volume in a phosphate buffered saline solution (PBS) or water, and eluted at 30 cm/hr linear velocity. FIG. 15A shows the SEC elution profile for a standard design column. Resolutions of eluted peaks are shown in Table 2 below.

TABLE 2

| Resolutions of Eluted Peaks | | |
|---|---|---|
| Blue Dextran/Acetone | Blue Dextran/BSA | BSA/Acetone |
| 4.1 | 1.8 | 0.8 |

Figure 15B:
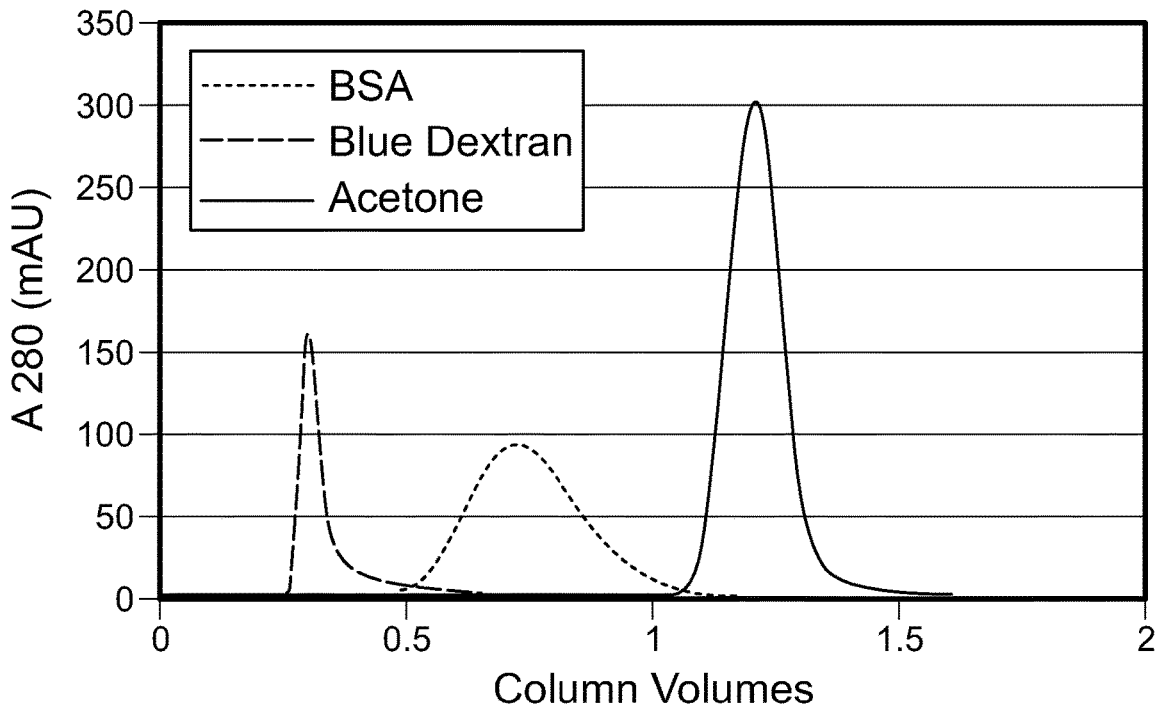

FIG. 15B and Table 3 below show the SEC results for the column with a recovery port on the side. Table 3 shows the resolution between molecular weight markers as calculated from the SEC chromatogram of the OPUS column with the resin recovery port on the side.

TABLE 3

| SEC Results | | |
|---|---|---|
| Blue Dextran/Acetone | Blue Dextran/BSA | BSA/Acetone |
| 7.7 | 2.7 | 1.5 |

A resolution of more than 1.5 is considered baseline resolution, meaning that the separation between two peaks is at baseline level. Resolution was not negatively impacted by the side port on the recovery column.

Example 4—Lack of Dead Zones Measured by Phosphate Clearance

The sanitary design of a pre-packed column is a critical feature. This experiment confirms the recovery port design and placement within the column tube does not create dead zones where molecules, chemical or microbial species, can become trapped and leach out over time. This effect was studied using an inorganic phosphate as a tracer molecule. OPUS columns with and without the packing port were packed with Sepharose 6 Fast Flow® (GE Healthcare) resin each at dimensions of 45 cm inner diameter×20 cm bed height.

In this experiment the OPUS® column was washed with 2-3 column volumes (CVs) of water at a flow rate of 100 cm/hr. Column was loaded with 1 CV of 1 M $Na_3PO_4$. Samples were collected for each 0.5 to 1 CV during loading and recirculation of phosphate on the column. The column was washed with water. Samples of the water wash column eluate were then collected every 0.2 CVs for the first 2.5 CVs. Samples were then collected every 0.5 CVs for a total of 6 CVs. The steps for a phosphate assay were: dilute samples (if necessary) and pipette 100 µL of each on a 96-well plate with a standard curve ranging from 250 µM $PO_4$ to 1 µM $PO_4$. Add 1004, of reagent (Assay Reagent: 2 volumes water, 1 volume 6 N sulfuric acid, 1 volume 2.5% ammonium molybdate, 1 volume 10% ascorbic acid) and incubated for 10 minutes @ 60° C. The limit of detection for the phosphate assay is 1 µM.

Figure 16A:
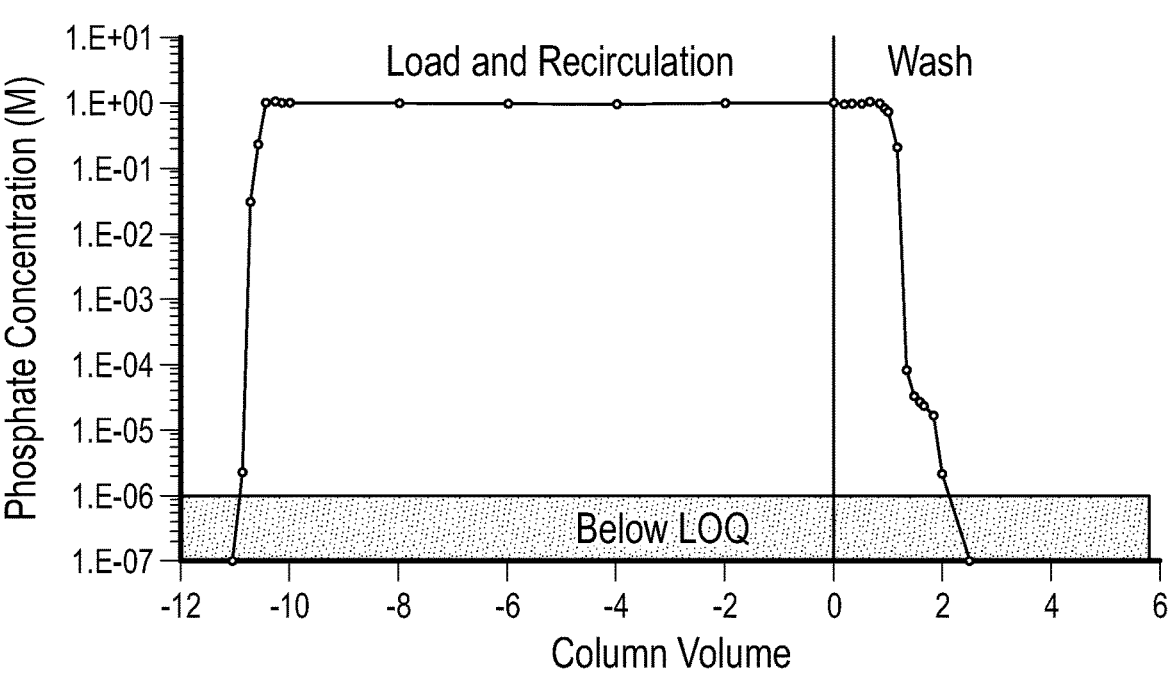
FIGS. 16A and B are examples showing lack of dead zones measured by phosphate clearance with a standard pre-packed column (FIG. 16A) and a column with a resin recovery port (FIG. 16B).
Figure 16B:
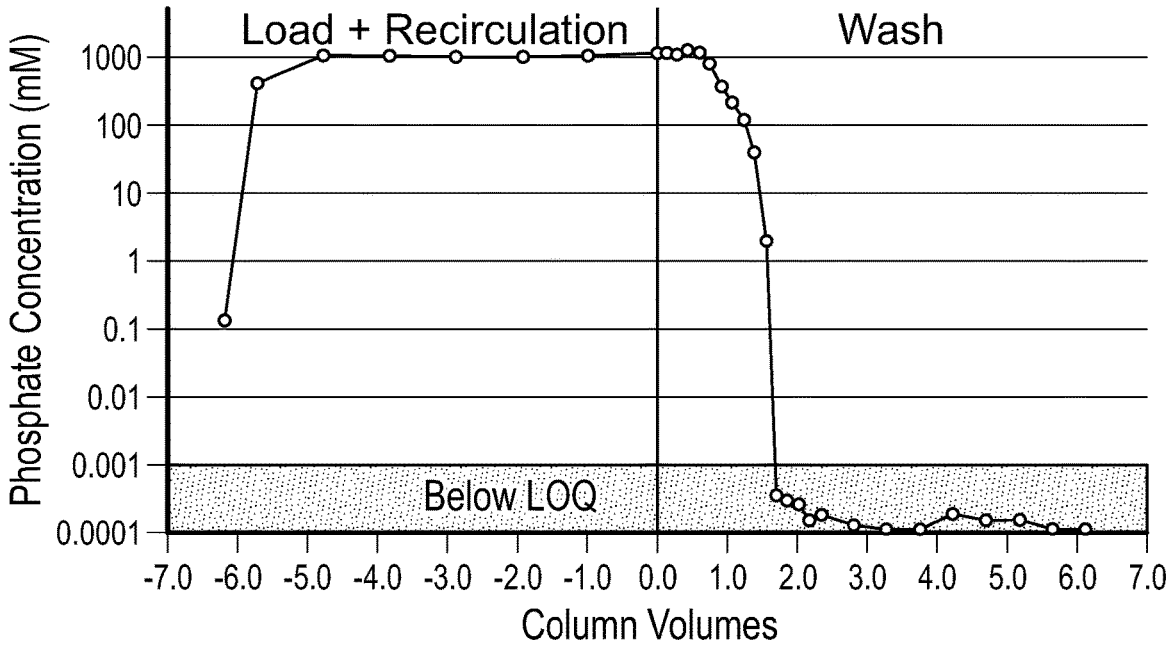

FIG. 16A shows results of a control experiment with an unmodified column design with >6 log reduction in a small molecule (e.g., phosphate) clearance after a 2.5 CV flush. FIG. 16B shows the results of the column with the port on the side, demonstrating a >6 log reduction in a small molecule (e.g., phosphate) clearance after a 2.5 CV flush. The profile in these two figures is almost identical, indicating that a small molecule (e.g., phosphate) does not get trapped within a "dead zone" due to the presence of the resin recovery port on the inner side of the tube wall.

Example 5—Lack of Dead Zones Measured by Bacterial and Endotoxin Removal

The ability to clean a chromatography column is a critical attribute. In this experiment it is shown that a column with a resin recovery port on the side can be cleaned and sanitized of bacterial and endotoxin contamination in a similar way as a column without a port on the side.

An OPUS® column of 45 cm ID packed to a bed height of 20 cm with Sepharose 6 Fast Flow® (GE Healthcare) was purposefully loaded with an E. coli culture with a density of 1 OD 600. The column was loaded by pumping 1 CV of bacterial culture at 100 cm/h. The column was left to incubate at room temperature for 16 hours. After incubation, the column was rinsed with water at a flow rate of 100 cm/h for 5 CVs. After rinse, the column was sanitized following the sanitization procedure:

Flushed with 1 M sodium hydroxide in up-flow at 100 cm/h for 30 minutes

Flushed with 1 M sodium hydroxide in down-flow at 100 cm/h for 30 minutes

Recirculation of 1 M sodium hydroxide for 2 hours in up-flow at 100 cm/hour

Incubation of the column in 1 M sodium hydroxide for 1 hour (static sanitization for compete removal of endotoxins)

Flushed with water at 100 cm/h until neutral pH is achieved.

Samples of the effluent were taken: post-inoculation, and post-sanitization for bioburden and endotoxin determination. Results are shown in Table 4.

TABLE 4

| Bioburden and Endotoxin Removal | | |
|---|---|---|
| | Bioburden | Endotoxin |
| After *E. coli* load | Too Numerous to Count | >0.25 EU/mL |
| After sanitization | 0 CFU/mL | <0.25 EU/mL |

Example 6—Recovery of Resin Using Liquid

Figure 17A:
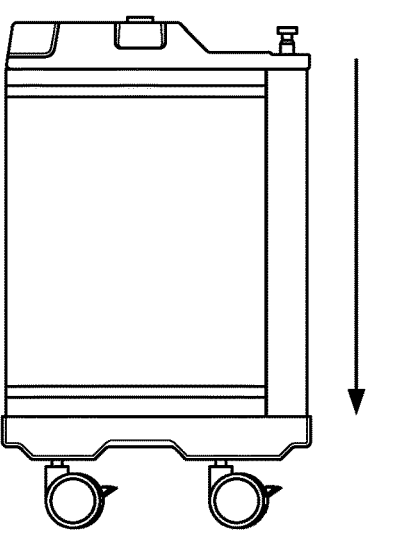
FIGS. 17A-C are pictures of the column with the resin recovery port fitted with the tubing assembly used during recovery of resin.
Figure 17B:
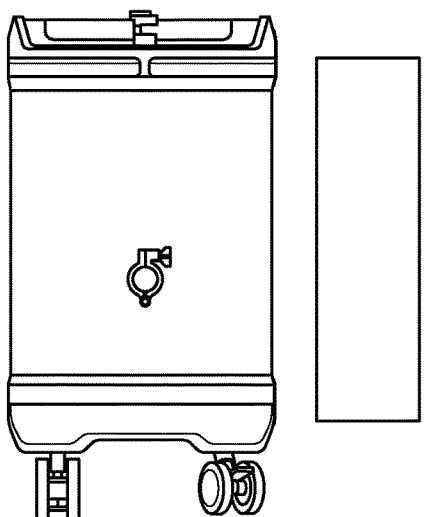
Figure 17C:
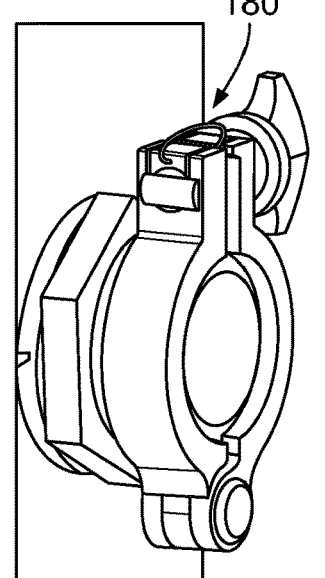

Referring to FIGS. 17A-C, this example shows a system where a port installed on the side wall of a column can be used to recover resin from a packed column. FIGS. 17A and B show a sideguard 62 that is attached to the side of the column and which is removed to expose the port when resin recovery begins, and a tie wrap 180 (FIG. 17C) removed from the clamp prior to recovery. A 45 cm inner diameter OPUS® chromatography column with a resin recovery side port was packed with Sepharose 6 Fast Flow® (GE Healthcare) resin to a 20 cm bed height. Tubing was connected to the inlet and outlet ports of the column. The side port plug was removed, and a 1.5" tube was connected to it with a 1.5" TC connection. The chromatography media was evacuated through the side port into a collection vessel where it was captured as a slurry. This was accomplished by pumping water into each port at the same time with a flow rate not exceeding 1 bar of back pressure to the system. This entire system and process, shown schematically in FIGS. 9-10, was performed with five column volumes (CV) of buffer.

Example 7—Recovery of Resin Using Liquid and Air

This example shows a system where a port installed on the side wall of a pre-packed column can be used to recover resin from a pre-packed column using a combination of liquid and gas. An OPUS® pre-packed chromatography column with a resin recovery side port was packed with various chromatography resins. A tubing set was connected to the inlet and outlet ports of the column in a "y" configuration allowing fluid flow to both ports simultaneously. Another piece of tubing was attached to the side port assembly with its free end positioned into a collection vessel of appropriate size to collect the resin slurry.

The first step was to provide fluid flow to the inlet and outlet column ports simultaneously and begin to expel the resin through the recovery side port. This was done by ramping up flow from 100 to 500 cm/hour over a period of 1-2 minutes using water (or a preferred solution can be substituted), 500 cm/hour is equivalent to 13.7 L/min for a 45 cm column. The pressure did not exceed 1 bar into the inlet port during this step. After pumping about 1 column volume (CV) of solution the flow was stopped.

Air was then supplied through the inlet port at a pressure of less than 0.5 bar until all possible slurry (remaining resin)

was removed through the side port and only air was being evacuated. The outlet port was closed during this step.

Next, water (or preferred solution) was pumped into the column outlet (in up-flow). The flow was ramped up from 100-500 cm/h over a period of 1-2 minutes to insure all the remaining resin was re-slurried (e.g., re-suspended) while filling the column with water and purging the air. Water (or a preferred solution) was pumped until it starts flowing from the inlet port to waste. At this point flow was stopped. The side port was closed during this step.

These steps of water and air purge were repeated until all the resin (or 90% or more of the resin, or what desired recovery yield) was recovered from the column. The amount of resin in the collection tank was measured to determine the percentage recovered. This entire system and process is shown schematically in FIGS. 11-12

In one experiment Sepharose® 6 FF (GE Healthcare) media was recovered from a 45 cm i.d. by 20 cm b.h. OPUS® pre-packed chromatography column with a resin recovery side port with 3 CV of solution, resulting in 99% resin yield. In a second experiment POROS® 50HQ media was recovered from a similar 45 cm by 20 cm column with 3.25 CV of solution, resulting in 99% yield.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A chromatography column comprising:

a column tube comprising a cylindrical wall, the column tube having a first end and a second end;

a first flow distributor arranged within the first end of the column tube and a second flow distributor arranged within the second end of the column tube;

an opening in the cylindrical wall of the column tube between locations where the first flow distributor and the second flow distributor are secured during use; and a recovery port assembly secured within the opening in the cylindrical wall of the column tube, wherein the recovery port assembly is configured to permit removal of a fluid from within the column tube in a chamber formed between the first and second flow distributors, the recovery port assembly comprising:

a port body machined from a rigid plastic extending through the opening in the cylindrical wall of the column tube, wherein the port body comprises a beveled flange disposed within the chamber;

a plug comprising an external end extending outside the port body configured to facilitate removal of the plug from the port body; and a clamp configured to secure the plug within the port body.

2. The chromatography column of claim 1, wherein the clamp is disposed about the external end of the plug.

3. The chromatography column of claim 1, wherein the flange of the port body projects less than 6 mm past an inner surface of the cylindrical wall of the column tube.

4. The chromatography column of claim 1, wherein the flange of the port body is configured to avoid zones without fluid accessibility in a fluid inside the column tube.

5. The chromatography column of claim 1, wherein the beveled surface of the flange comprises a profile configured to maintain laminar flow within the column tube.

6. The chromatography column of claim 1, wherein the port assembly comprises a nut disposed about the port body configured to secure the port body to the cylindrical wall of the column tube.

7. The chromatography column of claim 1, wherein the external end of the plug comprises an outer diameter larger than an inner diameter of the port body, and the plug comprises an internal end having an outer diameter smaller than the external end, the internal end configured to be removably disposed within the port body.

* * * * *